US012681402B2

(12) United States Patent
Katsumata et al.

(10) Patent No.: US 12,681,402 B2
(45) Date of Patent: Jul. 14, 2026

(54) TONER FOR DEVELOPING ELECTROSTATIC LATENT IMAGE AND PRODUCTION METHOD THEREOF

(71) Applicants: Shunki Katsumata, Shizuoka (JP); Toshihiko Karato, Shizuoka (JP); Taro Araki, Shizuoka (JP); Shintaro Akiyama, Shizuoka (JP)

(72) Inventors: Shunki Katsumata, Shizuoka (JP); Toshihiko Karato, Shizuoka (JP); Taro Araki, Shizuoka (JP); Shintaro Akiyama, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 670 days.

(21) Appl. No.: 18/069,066

(22) Filed: Dec. 20, 2022

(65) Prior Publication Data

US 2023/0205106 A1 Jun. 29, 2023

(30) Foreign Application Priority Data

Dec. 24, 2021 (JP) ................................ 2021-210289

(51) Int. Cl.
*G03G 9/08* (2006.01)
*G03G 9/087* (2006.01)
*G03G 9/097* (2006.01)

(52) U.S. Cl.
CPC ....... *G03G 9/09708* (2013.01); *G03G 9/0806* (2013.01); *G03G 9/0821* (2013.01); *G03G 9/08755* (2013.01); *G03G 9/0975* (2013.01)

(58) Field of Classification Search
CPC ............. G03G 9/09708; G03G 9/0806; G03G 9/0821; G03G 9/08755; G03G 9/0975
See application file for complete search history.

(56) References Cited

U.S. PATENT DOCUMENTS

2004/0137344 A1* 7/2004 Yamashita ........... G03G 9/0804 430/108.4
2004/0146309 A1* 7/2004 Shu .................... G03G 15/0877 399/53
2006/0040194 A1* 2/2006 Sugiura ................ G03G 9/0825 430/108.4
2010/0062352 A1 3/2010 Kusahara et al.
2010/0209838 A1 8/2010 Kusahara et al.
2011/0200929 A1 8/2011 Karato et al.
2015/0259123 A1 9/2015 Araki et al.
2019/0235405 A1 8/2019 Masuda et al.
2020/0301308 A1 9/2020 Makabe et al.

FOREIGN PATENT DOCUMENTS

JP H10207119 A * 8/1998
JP 2014178530 A * 9/2014
JP 2017-227839 12/2017
JP 2018-049150 3/2018
JP 6763258 9/2020

OTHER PUBLICATIONS

JP-2014178530-A Translation (Year: 2025).*
JP-H10207119-A Translation (Year: 2025).*
Megaface F 410, CAS 1192014-32-6, May 21, 2019 https://scifinder-n.cas.org/searchDetail/substance/69305d36849aaf3b8e062ca6/substanceDetails (Year: 2019).*
Calfax, Sep. 26, 2020, Pilot Chemical https://web.archive.org/web/20200926031226/https://www.pilotchemical.com/productcategory/calfax/#calfax-161-35 (Year: 2020).*
Calfax—Diphenyl Oxide Disulfonate Anionic Surfactants, Oct. 31, 2020, Pilot Chemical https://web.archive.org/web/20201031195832/https://www.pilotchemical.com/product/calfax/ (Year: 2020).*

* cited by examiner

*Primary Examiner* — Mark F. Huff
*Assistant Examiner* — Charles C. Sullivan, IV
(74) *Attorney, Agent, or Firm* — Grüneberg Global IP, PLLC

(57) ABSTRACT

A toner includes toner particles. Each toner particle includes a binder resin, a release agent, a colorant, and particles. The particles are metal particles, or halogen particles, or both. A metal constituting the metal particles may have a monovalent or higher ionic valence. An abundance X of the particles is within a range represented by $3\ \mu m^2 \leq X\ \mu m^2 \leq 10\ \mu m^2$. X $\mu m^2$ is the abundance X that is an area of the particles present in a surface portion of each of the toner particles as measured by SEM-EDX with setting acceleration voltage to 1 kV. A declining rate of the particles is 80% to 100%. Y $\mu m^2$ is an abundance Y that is an area of the particles present in a surface portion of each of the toner particles as measured by the SEM-EDX with setting acceleration voltage to 3 kV.

7 Claims, No Drawings

TONER FOR DEVELOPING ELECTROSTATIC LATENT IMAGE AND PRODUCTION METHOD THEREOF

CROSS-REFERENCE TO RELATED APPLICATION

The present application claims priority under 35 U.S.C. § 119 to Japanese Patent Application No. 2021-210289, filed Dec. 24, 2021, the contents of which are incorporated herein by reference in their entirety.

BACKGROUND OF THE INVENTION

1. Field of the Invention

The disclosures herein generally relate to a toner for developing an electrostatic latent image and a method of producing the toner.

2. Description of the Related Art

According to an electrophotographic method, images are typically formed by a series of the following processes. An electrostatic image is formed on a photoconductor (i.e., an electrostatic image bearer); the electrostatic image is developed with a developer to form a visible image (i.e., a toner image); the visible image is transferred onto a recording medium (e.g., paper) and fixed on the recording medium to form a fixed image. As the developer, a two-component developer and a one-component developer have been known. The two-component developer is made up of a carrier and a toner, and the one-component developer (e.g., a magnetic toner, and a non-magnetic toner) does not use a carrier.

To provide a toner that is used for developing an electrostatic image and reduces a defect associated with formation of unintentional color dots on a resulting image, the following toner has been proposed. The color dots are formed when an image of a low image density is repeatedly output in a high temperature and high humidity environment. The color dots are also formed as a result of a fixing failure of a toner image in a low temperature and low humidity environment. Namely, proposed is the toner where a concentration of a charge-controlling agent in a toner particle is calculated by energy dispersive X-ray spectroscopy (EDX) and the concentration of the charge-controlling agent along a depth direction is defined (see Japanese Patent No. 6763258).

SUMMARY OF THE INVENTION

In one embodiment, a toner for developing an electrostatic latent image includes toner particles. Each of the toner particles includes a binder resin, a release agent, a colorant, and particles. The particles are metal particles, or halogen particles, or a combination of the metal particles and the halogen particles, where a metal constituting the metal particles may have a monovalent or higher ionic valence. An abundance X of the particles is within a range represented by 3 $\mu m^2 \leq X\ \mu m^2 \leq 10\ \mu m^2$, where X $\mu m^2$ is the abundance X that is an area of the particles present in a surface portion of each of the toner particles measured by a scanning electron microscope-energy dispersive X-ray spectrometer (SEM-EDX) with setting a magnification to 40,000×, field of view to 100 $\mu m^2$, and acceleration voltage to 1 kV. A declining rate of the particles represented by Formula (1) is from 80% through 100%, $$\text{Declining rate of particles } (\%) = (X - Y)/X \times 100 \quad \text{Formula (1)}$$

where Y $\mu m^2$ is an abundance Y of the particles that is an area of the particles present in a surface portion of each of the toner particles as measured by the SEM-EDX with setting a magnification to 40,000×, field of view to 100 $\mu m^2$, and acceleration voltage to 3 kV.

DESCRIPTION OF THE PREFERRED EMBODIMENTS

The present invention is not limited to these embodiments, but various variations and modifications may be made without departing from the scope of the present invention.

(Toner for Developing Electrostatic Latent Image)

The toner for developing an electrostatic latent image (may be merely referred to as a "toner" hereinafter) of the present disclosure includes toner particles. Each of the toner particles includes a binder resin, a release agent, a colorant, and particles. The particles are metal particles, or halogen particles, or a combination of metal particles and halogen particles, where a metal constituting the metal particles may have a monovalent or higher ionic valence. An abundance X of the particles is within the range represented by 3 $\mu m^2 \leq X\ \mu m^2 \leq 10\ \mu m^2$, where X $\mu m^2$ is the abundance X that is an area of the particles present in a surface portion of each of the toner particles measured by a scanning electron microscope-energy dispersive X-ray spectrometer (SEM-EDX) with setting a magnification to 40,000×, field of view to 100 $\mu m^2$, and acceleration voltage to 1 kV. A declining rate of the particles represented by Formula (1) is from 80% through 100%, $$\text{Declining rate of particles } (\%) = (X - Y)/X \times 100 \quad \text{Formula (1)}$$

where Y $\mu m^2$ is an abundance Y of the particles that is an area of the particles present in a surface portion of each of the toner particles as measured by the SEM-EDX with setting a magnification to 40,000×, field of view to 100 $\mu m^2$, and acceleration voltage to 3 kV.

The toner may further include other components according to the necessity.

The "toner particle" is also referred to as a "toner base particle" in the present specification.

An object of the present disclosure is to provide a toner for developing an electrostatic latent image, where the toner achieves excellent low-temperature fixability, hot-offset resistance, and heat-resistant storage stability with minimizing toner scattering.

The present disclosure can provide a toner for developing an electrostatic latent image, where the toner achieves excellent low-temperature fixability, hot-offset resistance, and heat-resistant storage stability with minimizing toner scattering.

In the related art, for example, a dry toner is used as a toner. The dry toner is produced by melting and kneading a binder resin (e.g., a styrene-based resin, and a polyester-based resin) together with a colorant etc., and finely pulverizing the kneaded product. In order to achieve a high-quality image, reducing a particle size of a toner has been attempted. Particles of a toner produced by a typical production method, such as a kneading and pulverizing method, have irregular shapes. When such a toner is used as a two-component developer, the toner particles are further pulverized by stirring with a carrier inside a developing unit. When the toner is used as a one-component developer, the toner particles are further pulverized by contact stress with a developing roller, a toner supply roller, a layer-thickness regulating blade, or a friction charging blade. As a result, extremely fine particles may be generated, or a flowability improving agent may be embedded in a surface of each toner particle. Therefore, image quality of a resulting image may become inadequate. Moreover, flowability may be impaired due to the irregular particle shapes. To compensate the inadequate flowability, a large amount of the flowability improving agent may be used to improve flowability. In addition, a rate of a toner bottle filled with the toner may become low because of the irregular toner particle shapes, which may hinder downsizing of a device, such as an image forming apparatus. Therefore, benefits from a reduced particle size may not be adequately obtained. Moreover, the pulverization method has a limit on how far particle diameters of resulting toner particles can be reduced, and thus the pulverization method cannot achieve further reduction of a particle size. Moreover, a transfer process of transferring an image formed with multiple-color toners to a transfer medium or paper for forming a full-color image has become complicated. Use of a toner having irregular toner particle shape, such as a pulverization toner, may leave missing blank spots in a transferred image due to poor transfer properties. Therefore, a large amount of the toner may be used to avoid formation of blank spots in the transferred image.

Accordingly, there is a high demand for further improving transfer efficiency to form a high-quality image without blank spots in the image using a low amount of the toner to be consumed, which reduces a running cost. When the transfer efficiently is excellent, there is no need to arrange a cleaning unit configured to removing a untransferred toner transfer from a photoconductor or a transfer medium, which leads to downsizing of an image forming apparatus, cost reduction, and reduction in an amount of the wasted toner. To solve the above-described problems, various methods of producing spherical toner particles have been studied. For example, a production method of a toner according to a suspension polymerization method, an emulsion polymerization aggregation method, or a polymer dissolution suspension method has been proposed.

In a method for producing a toner in an aqueous medium, such as a suspension polymerization method, an emulsion polymerization aggregation method, and a polymer dissolution suspension method, a method where a charge-controlling agent (e.g., a metal salt, and a fluorosurfactant) is added to toner slurry may be often employed for imparting charging capability to a resulting toner. However, it is difficult to evenly deposit a thin layer of the charge-controlling agent due to other substances present at a surface portion of each toner particle. If a large amount of the charge-controlling agent is added to improve a charging amount, a layer of the charge-controlling agent becomes thick, which impairs low-temperature fixability of a resulting toner. When a layer of the deposited charge-controlling agent is not thin nor even, there are regions where a charging amount is low, causing toner scattering.

For example, a toner having high resistance to environmental fluctuations, such as temperatures and humidity, has been proposed in Japanese Unexamined Patent Application Publication No. 2018-049150. The resistant is imparted to the disclosed toner by calculating a concentration of a chare-controlling agent in the toner by an energy dispersive X-ray spectrometer (EDX) and defining the concentration along the depth direction of the toner particle. However, the proposed toner still has problems that fixability may not be assured when the deposition layer of the charge-controlling agent is thick along the depth direction of the toner particle, and toner scattering may occur as uniform deposition of the charge-controlling agent is not considered.

To solve the above-described problems existing in the art, the present inventors have diligently conducted research. As a result, the present inventors have found that a toner having excellent characteristics (e.g., low-temperature fixability, hot-offset resistance, and heat-resistant storage stability), minimizing occurrence of toner scattering, and having excellent stability during practical use, as well as an effective production method of the toner are obtained when the toner for developing an electrostatic latent image according to the present disclosure has the above-described configuration.

<<Abundance X (X $\mu m^2$) of the Particles in Surface Portion of Toner Particle of Toner for Developing Electrostatic Latent Image>>

In the toner for developing an electrostatic latent image, the abundance X of the particles is 3 $\mu m^2 \leq 5 \leq X\ \mu m^2 \leq 10\ \mu m^2$, and preferably 4 $\mu m^2 \leq X\ \mu m^2 \leq 7\ \mu m^2$, where X $\mu m^2$ is the abundance X that is an area of the particles present in a surface portion of each of the toner particles measured by a scanning electron microscope-energy dispersive X-ray spectrometer (SEM-EDX) with setting a magnification to 40,000×, field of view to 100 $\mu m^2$, and acceleration voltage to 1 kV. When the abundance X (X $\mu m^2$) of the particles is less than 3 $\mu m^2$, charging properties may be impaired. When the abundance X (X $\mu m^2$) of the particles is greater than 10 $\mu m^2$, an amount of the particles relative to the toner particle increases, thus, impairing fixability.

<<Declining Rate of Particles in Surface Portion of Toner Particle of Toner for Developing Electrostatic Latent Image>>

In the toner for developing an electrostatic latent image, the declining rate of the particles represented by Formula (1) is from 80% through 100%, and preferably from 90% through 100%, where Y $\mu m^2$ is an abundance Y of the particles that is an area of the particles in a surface portion of the toner particle as measured by the SEM-EDX with setting a magnification to 40,000×, field of view to 100 $\mu m^2$, and acceleration voltage to 3 kV. When the declining rate of the particles is from 80% through 100%, the charge-controlling agent is suitably deposited at surface portions of the toner particles, and thinner and uniform deposition of the charge-controlling agent at the surface portions of the toner particles can be achieved. When the declining rate of the particles is less than 80%, an amount of the particles at the surface portion of each of the toner particles increases, thus, impairing fixability. When the declining rate of the particles is greater than 100%, the particles are embedded into the toner particles and an amount of the particles at the surface portion of each of the toner particles becomes small, thus, impairing charging properties.

$$\text{Declining rate of particles (\%)} = (X-Y)/X \times 100 \qquad \text{Formula (1)}$$

<<Abundance Y (Y $\mu m^2$) of Particles on Surface of Toner for Developing Electrostatic Latent Image>>

The abundance Y of the particles, which is an area (Y $\mu m^2$) of the particles present in a surface portion of each of the toner particles as measured by the SEM-EDX with setting a magnification to 40,000×, field of view to 100 $\mu m^2$, and acceleration voltage to 3 kV, is not particularly limited, provided that the declining rate of the particles is from 80% through 100%. The abundance Y (Y $\mu m^2$) of the particles may be appropriately selected in accordance with the intended purpose. The abundance of the particles preferably satisfies 0.6 $\mu m^2 \leq Y\ \mu m^2 \leq 2\ \mu m^2$, and more preferably 0.8 $\mu m^2 \leq 5$ Y $\mu m^2 \leq 1.4\ \mu m^2$. When the abundance Y (Y $\mu m^2$) of the particles is within the above-mentioned preferable range, excellent charging properties are assured.

<<Abundance Z (Z $\mu m^2$) of Particles on Surface of Toner for Developing Electrostatic Latent Image>>

The abundance Z of the particles, which is an area (Z $\mu m^2$) of the particles present in a surface portion of each of the toner particles as measured by the SEM-EDX with setting a magnification to 40,000×, field of view to 100 $\mu m^2$, and acceleration voltage to 5 kV, is not particularly limited, and may be appropriately selected in accordance with the intended purpose. The abundance Z (Z $\mu m^2$) of the particles is preferably 0 (zero) considering charging properties.

The deviation in the acceleration voltage corresponds to the deviation in the depth of the toner particle where measurement is performed.

When a toner sample uses polyester as a binder resin, for example, the measurement performed with the acceleration voltage of 1 kV provides information of a region that is approximately 0.03 μm in depth from a surface of a toner particle, the measurement performed with the acceleration voltage of 3 kV provides information of a region that is about approximately 0.08 μm in depth from the surface of the toner particle, and the measurement performed with the acceleration voltage of 5 kV provides information of a region that is approximately 0.13 μm in depth from the surface of the toner particle.

The measuring depth corresponding to the acceleration voltage does not significantly change depending on a binder resin to be used. When a binder resin is a resin other than polyester in the present disclosure, therefore, the similar results may be obtained with the acceleration voltage of 1 kV, 3 kV, and 5 kV.

<<Relative Amount of Wax at Surface of Toner Particle of Toner for Developing Electrostatic Latent Image>>

An intensity ratio ($P_{2850}/P_{828}$) is not particularly limited, and may be appropriately selected in accordance with the intended purpose. The intensity ratio ($P_{28520}/P_{828}$) is a ratio of an absorption spectrum peak at a wavelength of 2,850 $cm^{-1}$ to an absorption spectrum peak at a wavelength of 828 $cm^{-1}$, which are determined by measuring the surface of the toner particle by Fourier transform infrared spectroscopy-attenuated total reflectance (FTIR-ATR). The intensity ratio ($P_{2850}/P_{828}$) is preferably 0.10 or greater and 0.19 or less, and more preferably 0.14 or greater and 0.16 or less. When the intensity ratio ($P_{2850}/P_{828}$) is 0.10 or greater, excellent low-temperature fixability is assured. When the intensity ratio ($P_{2850}/P_{828}$) is 0.19 or less, excellent hot-offset resistance is assured.

The intensity ratio ($P_{2850}/P_{828}$) is an index for a relative amount of the release agent at a surface of each of the toner particles.

The absorption spectrum peak at the wavelength of 828 $cm^{-1}$ and the absorption spectrum peak at the wavelength of 2,850 $cm^{-1}$ can be measured in the following manner. As a measuring sample, 3 g of a toner is pressed by means of an automatic pelletizer for 1 minute with load of 6 t to prepare a toner pellet having a diameter of 40 mm and a thickness of approximately 2 mm. The prepared toner pellet is measured by means of a Fourier transform infrared spectrometer (FT-IR) with micro attenuated total reflectance (ATR) of a germanium (Ge) crystal having a diameter of 100 μm, where an incidence angle of an infrared ray is set to 41.5°, resolution is set to 4 $cm^{-1}$, and integration is 20 times. The intensity ratio ($P_{2850}/P_{828}$) is an average value of values obtained by performing the above-described measurement four times.

A volume average particle diameter of the toner particles is not particularly limited an may be appropriately selected in accordance with the intended purpose. The volume average particle diameter of the toner particles is preferably from 4.9 μm through 5.5 μm.

For example, the volume average particle diameter of the toner particles may be determined by measuring using a particle size analyzer (Multisizer, available from Beckman Coulter, Inc.) with an aperture diameter of 100 μm, and analyzing with analysis software (Beckman Coulter Multisizer 3, Version 3.51).

<Binder Resin>

The binder resin is not particularly limited, and may be appropriately selected from binder resins known in the art. Examples of the binder resin include: styrenes, such as styrene, parachlorostyrene, and α-methylstyrene; unsaturated bond-containing esters, such as methyl acrylate, ethyl acrylate, n-propyl acrylate, lauryl acrylate, 2-ethylhexyl acrylate, methyl methacrylate, ethyl methacrylate, n-propyl methacrylate, lauryl methacrylate, and 2-ethylhexyl methacrylate; nitriles, such as acrylonitrile, an methacrylonitrile; vinyl ethers, such as vinyl methyl ether, and vinyl isobutyl ether; vinyl ketones, such as methyl vinyl ketone, ethyl vinyl ketone, and isopropenyl vinyl ketone; polymers or copolymers of monomers, such as olefins (e.g., ethylene, propylene, and butadiene), and mixture of any of the foregoing binder resins.

Moreover, a non-vinyl-based condensation resin (e.g., an epoxy resin, a polyester resin, a polyurethane resin, a polyamide resin, a cellulose resin, and a polyether resin), or a mixture of any of the foregoing condensation resins and a vinyl-based resin, or a graft polymer obtained by polymerizing a vinyl-based monomer in the presence of any of the foregoing polymers may be used.

Among the above-listed examples, the binder resin is preferably a polyester resin because the polyester resin imparts excellent low-temperature fixability and color reproducibility to a resulting toner.

<<Polyester Resin>>

The polyester resin is not particularly limited, and may be appropriately selected in accordance with the intended purpose. Examples of the polyester resin include an amorphous polyester resin, a modified polyester resin, and a crystalline polyester resin. The above-listed examples may be used alone or in combination.

—Amorphous Polyester Resin—

The amorphous polyester resin (may be also referred to as an "unmodified polyester resin" hereinafter) is not particularly limited, and may be appropriately selected in accordance with the intended purpose. Examples of the amorphous polyester resin include an amorphous polyester resin obtained through a reaction between polyol and polycarboxylic acid.

As described above, the term "amorphous polyester resin" means a polyester resin obtained through a reaction between a polyol and polycarboxylic acid. A modified polyester resin, such as the below-described prepolymer, and a modified polyester resin obtained through a cross-linking reaction and/or an elongation reaction of the prepolymer, is not classified as the amorphous polyester resin in the present disclosure. Instead, such a modified polyester resin is referred to as a modified polyester resin.

The amorphous polyester resin is a polyester resin component soluble to tetrahydrofuran (THF).

Examples of the polyol include a diol.

Examples of the diol include bisphenol A C2-C3 alkylene oxide adducts (the average number of moles added: from 1 through 10) [e.g., polyoxypropylene(2.2)-2,2-bis(4-hydroxyphenyl)propane, and polyoxyethylene (2.2)-2,2-bis(4-hydroxyphenyl)propane], ethylene glycol, propylene glycol, hydrogenated bisphenol A, and hydrogenated bisphenol A C2-C3 alkylene oxide adducts (the average number of moles added: from 1 through 10). The above-listed examples may be used alone or in combination.

Examples of the polycarboxylic acid include a dicarboxylic acid.

Examples of the dicarboxylic acid include adipic acid, phthalic acid, isophthalic acid, terephthalic acid, fumaric acid, maleic acid, and C1-C20 alkyl group or C2-C20 alkenyl group-substituted succinic acid (e.g., dodecenyl succinic acid, and octyl succinic acid). The above-listed examples may be used alone or in combination.

For adjusting an acid value or hydroxyl value, the amorphous polyester resin may include trivalent or higher carboxylic acid, trivalent or higher alcohol, or a trivalent or higher epoxy compound at terminals of the molecular chain of the amorphous polyester resin. The above-listed examples may be used alone or in combination.

—Modified Polyester Resin—

The modified polyester resin (may be also referred to as a “modified polyester” hereinafter) is not particularly limited, and may be appropriately selected in accordance with the intended purpose. Examples of the modified polyester resin include a reaction product obtained from a reaction between an active hydrogen group-containing compound and a polyester resin having a site reactive with the active hydrogen group-containing compound (may be also referred to as a “prepolymer,” a “polyester prepolymer,” or a “binder resin precursor” in the present specification).

The polyester prepolymer preferably used in the present embodiment is a prepolymer obtained by introducing a functional group (e.g., an isocyanate group) that reacts with an active hydrogen group to polyester including an active hydrogen group (e.g. an acid group, and a hydroxyl group) at a terminal of the molecular chain of the polyester. Therefore, a modified prepolymer (e.g., urea-modified prepolymer) may be derived from the prepolymer. In the present embodiment, a modified polyester preferably used as a binder resin of the toner is urea-modified polyester obtained by reacting an isocyanate group-containing polyester prepolymer with any of amines serving as a cross-linking agent and/or an elongating agent.

—Active Hydrogen Group-Containing Compound—

The active hydrogen group-containing compound is a compound that reacts with the polyester resin having a site reactive with the active hydrogen group-containing compound.

As a cross-linking agent used for the polyester resin having a site reactive with the active hydrogen group-containing compound, amines are used. As an elongating agent, a diisocyanate compound (e.g., diphenylmethane diisocyanate) may be used.

The active hydrogen group is not particularly limited, and may be appropriately selected in accordance with the intended purpose. Examples of the active hydrogen group include a hydroxyl group (e.g., an alcoholic hydroxyl group, and a phenolic hydroxyl group), an amino group, a carboxyl group, and a mercapto group. The above-listed examples may be used alone or in combination. Among the above-listed examples, the active hydrogen group is preferably an alcoholic hydroxyl group.

The active hydrogen group-containing compound is not particularly limited, and may be appropriately selected in accordance with the intended purpose. When the polyester resin having the site reactive with the active hydrogen group-containing compound is a polyester resin including an isocyanate group, the active hydrogen group-containing compound is preferably amines because the molecular weight of the polyester resin can be increased by an elongation reaction or cross-linking reaction between any of the amines and the polyester resin.

The amines described hereinafter act as a cross-linking agent or an elongating agent for modified polyester that reacts with an active hydrogen group.

The amines are not particularly limited, and may be appropriately selected in accordance with the intended purpose. Examples of the amines include a diamine, a trivalent or higher polyamine, an amino alcohol, an amino mercaptan, an amino acid, and any of the above-listed amines in which an amino group is blocked. The above-listed examples may be used alone or in combination.

Examples of the diamine include an aromatic diamine (e.g., phenylene diamine, diethyltoluene diamine, and 4,4'-diaminodiphenylmethane); an alicyclic diamine (e.g., 4,4'-diamino-3,3'-dimethyldicyclohexylmethane, diamine cyclohexane, and isophorone diamine); and an aliphatic diamine (e.g., ethylene diamine, tetramethylene diamine, and hexamethylene diamine).

Examples of the trivalent or higher polyamine include diethylene triamine, and triethylene tetramine.

Examples of the amino alcohol include ethanol amine, and hydroxyethylaniline.

Examples of the amino mercaptan include aminoethyl mercaptan, and aminopropyl mercaptan.

Examples of the amino acid include amino propionic acid, and amino caproic acid.

Examples of the amine in which an amino group is blocked include ketimine compounds and oxazolin compounds obtained from the above-listed amines or ketones (e.g., acetone, methyl ethyl ketone, and methyl isobutyl ketone).

Among the above-listed amines, a diamine or a mixture of a diamine and a small amount of a trivalent or higher polyamine is preferable.

A blending ratio of the amines is not particularly limited, and may be appropriately selected in accordance with the intended purpose. An equivalent ratio [NCO]/[NHx] of an isocyanate group [NCO] in the isocyanate group-containing prepolymer to an amino group [NHx] in the amines is preferably 1/2 or greater and 2/1 or less, more preferably 1.5/1 or greater and 1/1.5 or less, and even more preferably 1.2/1 or greater and 1/1.2 or less. When the ratio [NCO]/[NHx] is 2/1 or less, or 1/2 or greater, a polyester having a high molecular weight is formed, and excellent hot-offset resistance is assured.

——Polyester Resin Having Site Reactive with Active Hydrogen Group-Containing Compound——

The polyester resin having a site reactive with the active hydrogen group-containing compound is not particularly limited, and may be appropriately selected in accordance with the intended purpose. Examples of the polyester resin having a site reactive with the active hydrogen group-containing compound include an isocyanate group-containing polyester resin (may be referred to as an “isocyanate group-containing polyester prepolymer” hereinafter). The isocyanate group-containing polyester resin is not particularly limited, and may be appropriately selected in accordance with the intended purpose. Examples of the isocyanate group-containing polyester resin include a reaction product obtained by reacting active hydrogen group-containing polyester, which is a polycondensation product between polyol and polycarboxylic acid, with polyisocyanate.

The polyol is not particularly limited, and may be appropriately selected in accordance with the intended purpose. Examples of the polyol include a diol, a trivalent or higher alcohol, and a mixture of a diol and a trivalent or higher alcohol. The above-listed examples may be used alone or in combination.

Among the above-listed examples, a diol, and a mixture of a diol with a small amount of a trivalent or higher alcohol are preferable.

The diol is not particularly limited, and may be appropriately selected in accordance with the intended purpose. Examples of the diol include: an alkylene glycol, such as ethylene glycol, 1,2-propyleneglycol, 1,3-propyleneglycol, 1,4-butanediol, and 1,6-hexanediol; alkylene ether glycol, such as diethylene glycol, triethylene glycol, dipropylene glycol, polyethylene glycol, polypropylene glycol, and polytetramethylene ether glycol; alicyclic diol, such as 1,4-cyclohexanedimethanol, and hydrogenated bisphenol A; bisphenols, such as bisphenol A, bisphenol F, and bisphenol S; alkylene oxide (e.g., ethylene oxide, propylene oxide, and butylene oxide) adducts of the foregoing alicyclic diols; and alkylene oxide (e.g., ethylene oxide, propylene oxide, and butylene oxide) adducts of the foregoing bisphenols. The above-listed examples may be used alone or in combination. Among the above-listed examples, the diol is preferably C2-C12 chain alkyl glycol, or an alkylene oxide adduct of bisphenols, or both, and more preferably an alkylene oxide adduct of bisphenols, or a mixture of an alkylene oxide adduct of bisphenols and C2-C12 chain alkylene glycol.

Examples of the trivalent or higher polyol include: a multivalent aliphatic alcohol, such as a trivalent or higher and octavalent or lower glycerin or monovalent or higher glycerin, trimethylol ethane, trimethylol propane, pentaerythritol, and sorbitol; trivalent or higher phenols, such as trisphenol PA, phenol novlac, and cresol novolac; and an alkylene oxide adduct of any of the above-listed trivalent or higher polyphenols. The above-listed examples may be used alone or in combination.

The polycarboxylic acid is not particularly limited, and may be appropriately selected in accordance with the intended purpose. Examples of the polycarboxylic acid include dicarboxylic acid, trivalent or higher carboxylic acid, and a mixture of a dicarboxylic acid and a trivalent or higher carboxylic acid. The above-listed examples may be used alone or in combination. Among the above-listed examples, a dicarboxylic acid, and a mixture of a dicarboxylic acid with a small amount of a trivalent or higher polycarboxylic acid are preferable.

The dicarboxylic acid is not particularly limited, and may be appropriately selected in accordance with the intended purpose. Examples of the dicarboxylic acid include: an alkylene dicarboxylic acid, such as succinic acid, adipic acid, and sebacic acid; an alkenylene dicarboxylic acid, such as maleic acid, and fumaric acid; and an aromatic dicarboxylic acid, such as phthalic acid, isophthalic acid, terephthalic acid, and naphthalene dicarboxylic acid. The above-listed examples may be used alone or in combination. Among the above-listed examples, the dicarboxylic acid is preferably a C4-C20 alkenylene dicarboxylic acid or a C8-C20 aromatic dicarboxylic acid.

The trivalent or higher polycarboxylic acid is not particularly limited, and may be appropriately selected in accordance with the intended purpose. Examples of the trivalent or higher polycarboxylic acid include a C9-C20 aromatic polycarboxylic acid, such as trimellitic acid, and pyromellitic acid.

The polycarboxylic acid may be reacted with polyol using acid anhydride of the above-mentioned compound or lower alkyl ether (e.g., methyl ester, ethyl ester, or isopropyl ester).

When the polyol and the polycarboxylic acid are allowed to react through polycondensation, a blending ratio between the polyol and the polycarboxylic acid is not particularly limited, and may be appropriately selected in accordance with the intended purpose. An equivalent ratio [OH]/[COOH] of a hydroxyl group [OH] to a carboxyl group [COOH] is preferably 2/1 or greater and 1/1 or less, more preferably 1.5/1 or greater and 1/1 or less, and even more preferably 1.3/1 or greater and 1.02/1 or less.

The polyisocyanate is not particularly limited, and may be appropriately selected in accordance with the intended purpose. Examples of the polyisocyanate include: an aliphatic polyisocyanate, such as tetramethylene diisocyanate, hexamethylene diisocyanate, and methyl 2,6-diisocyanatocaproate; an alicyclic polyisocyanate, such as isophorone diisocyanate, cyclohexylmethane diisocyanate; an aromatic diisocyanate, such as tolylene diisocyanate, diphenylmethane diisocyanate; aromatic aliphatic diisocyanate, such as α,α,α',α'-tetramethylxylilene diisocyanate; isocyanurates; and a compound in which any of the foregoing polyisocyanates is blocked with a phenol derivative, oxime, or caprolactam. The above-listed examples may be used alone or in combination.

When the polyisocyanate reacts with the polyester resin including a hydroxyl group, a blending ratio of the polyisocyanate is not particularly limited, and may be appropriately selected in accordance with the intended purpose. An equivalent ratio (NCO/OH) of an isocyanate group of the polyisocyanate to a hydroxyl group of the polyester resin is preferably 1/1 or greater and 5/1 or less, more preferably 1.2/1 or greater and 4/1 or less, and even more preferably 1.5/1 or greater and 2.5/1 or less. When the equivalent ratio [NCO]/[OH] is 5/1 or less, excellent low-temperature fixability is assured. When the equivalent ratio [NCO]/[OH] is 1/1 or greater, an adequate amount of urea is present in the modified polyester, consequently imparting desirable hot-offset resistance to a resulting toner.

An amount of the polyisocyanate constituent component in the prepolymer including an isocyanate group at a terminal is not particularly limited, and may be appropriately selected in accordance with the intended purpose. The amount of the polyisocyanate constituent component in the prepolymer including an isocyanate group at a terminal is preferably 0.5% by mass or greater and 40% by mass or less, more preferably 1% by mass or greater and 30% by mass or less, and even more preferably 2% by mass or greater and 20% by mass or less. When the amount of the polyisocyanate constituent component in the prepolymer including an isocyanate group at a terminal is 0.5% by mass or greater, excellent hot-offset resistance is assured, and both heat-resistant storage stability and low-temperature fixability are achieved. When the amount of the polyisocyanate constituent component in the prepolymer including an isocyanate group at a terminal is 40% by mass or less, excellent low-temperature fixability is assured.

The modified polyester, such as urea-modified polyester obtained by reacting the isocyanate group-containing prepolymer with the amines, is suitable because a molecular weight of the polymer component of the modified polyester is easily adjusted, and oil-less low-temperature fixability (a wide range of releasing properties and fixability especially to an image forming apparatus without a system of applying release oil to a heating member used for fixing) is imparted to particularly a dry toner. Particularly, the modified polyester obtained by modifying the terminal of the polyester prepolymer with urea can minimize adhesion of a resulting toner to a heating member used for fixing, with assuring high flowability and transparency owing to unmodified polyester within a fixing temperature range.

Moreover, an elongation-reaction terminator may be optionally used to adjust a molecular weight of the polyester.

The elongation-reaction terminator is not particularly limited, and may be appropriately selected in accordance with the intended purpose. Examples of the elongation-reaction terminator include: monoamine, such as diethyl amine, dibutyl amine, butyl amine, and lauryl amine; and compounds, such as a ketimine compound in which any of the foregoing monoamine is blocked.

A weight average molecular weight of modified polyester, such as the urea-modified polyester, is not particularly limited, and may be appropriately selected in accordance with the intended purpose. The weight average molecular weight of the modified polyester is preferably 3,000 or greater and 20,000 or less. When the weight average molecular weight of the modified polyester, such as the urea-modified polyester resin, is 3,000 or greater, a reaction speed can be easily controlled and stable production can be assured. When the weight average molecular weight of the modified polyester is 20,000 or less, desirable modified polyester is formed and excellent offset resistance is imparted to a resulting toner.

—Crystalline Polyester Resin—

The crystalline polyester resin is not particularly limited, and may be appropriately selected in accordance with the intended purpose. For example, the crystalline polyester resin can be formed through polycondensation between multivalent alcohol (PO) and multivalent carboxylic acid (PC).

The multivalent alcohol compound (PO) is not particularly limited, and may be appropriately selected in accordance with the intended purpose. Examples of the multivalent alcohol compound (PO) include a divalent alcohol (DIO), and a trivalent or higher multivalent alcohol (TO). The multivalent alcohol compound (PO) is preferably DIO alone, or a mixture of DIO with a small amount of TO.

The divalent alcohol (DIO) is not particularly limited, and may be appropriately selected in accordance with the intended purpose. Examples of the divalent alcohol (DIO) include: alkylene glycol, such as ethylene glycol, 1,2-propyleneglycol, 1,3-propyleneglycol, 1,4-butanediol, 1,6-hexanediol, and 1,12-decanediol; alkylene ether glycol, such as diethylene glycol, triethylene glycol, dipropylene glycol, polyethylene glycol, polypropylene glycol, and polytetramethylene ether glycol; alicyclic diol, such as 1,4-cyclohexanedimethanol, and hydrogenated bisphenol A; bisphenols, such as bisphenol A, bisphenol F, and bisphenol S; alkylene oxide (e.g., ethylene oxide, propylene oxide, and butylene oxide) adducts of the foregoing alicyclic diols; and alkylene oxide (e.g., ethylene oxide, propylene oxide, and butylene oxide) adducts of the foregoing bisphenols.

The trivalent or higher multivalent alcohol (TO) is not particularly limited, and may be appropriately selected in accordance with the intended purpose. Examples of the trivalent or higher multivalent alcohol (TO) include: a trivalent through octavalent or higher multivalent alicyclic alcohol, such as glycerin, trimethylolethane, trimethylolpropane, pentaerythritol, and sorbitol; trivalent or higher phenols, such as trisphenol PA, phenol novolac, and cresol novolac; and alkylene oxide adducts of the above-listed trivalent or higher polyphenols.

The multivalent carboxylic acid (PC) is not particularly limited, and may be appropriately selected in accordance with the intended purpose. Examples of the multivalent carboxylic acid (PC) include a divalent carboxylic acid (DIC), and a trivalent or higher multivalent carboxylic acid (TC). The multivalent carboxylic acid (PC) is preferably DIC alone, or a mixture of DIC and a small amount of TC.

The divalent carboxylic acid (DIC) is not particularly limited, and may be appropriately selected in accordance with the intended purpose. Examples of the divalent carboxylic acid (DIC) include: an alkylene dicarboxylic acid, such as succinic acid, adipic acid, and sebacic acid; alkenylene dicarboxylic acid, such as maleic acid, and fumaric acid; and an aromatic dicarboxylic acid, such as phthalic acid, isophthalic acid, terephthalic acid, and naphthalene dicarboxylic acid. Among the above-listed examples, the divalent carboxylic acid (DIC) is preferably a C4-C20 alkenylene dicarboxylic acid or a C8-C20 aromatic dicarboxylic acid.

The trivalent or higher multivalent carboxylic acid (TC) is not particularly limited, and may be appropriately selected in accordance with the intended purpose. Examples of the trivalent or higher multivalent carboxylic acid (TC) include C9-C20 aromatic multivalent carboxylic acid, such as trimellitic acid, and pyromellitic acid.

The multivalent carboxylic acid (PC) may be reacted with the multivalent alcohol (PO) using an acid anhydride of lower alkyl ester (e.g., methyl ester, ethyl ester, and isopropyl ester) of the foregoing multivalent carboxylic acids.

A weight average molecular weight (Mw) of the binder resin is not particularly limited, and may be appropriately selected in accordance with the intended purpose. The weight average molecular weight (Mw) of the tetrahydrofuran (THF) soluble component of the binder resin is preferably 1,000 or greater and 30,000 or less, as heat-resistant storage stability can be assured, an effect of low-temperature fixability is exhibited, and offset resistance is imparted to a resulting toner owing to the modification with the prepolymer. When the weight average molecular weight (Mw) of the THF-soluble component of the binder resin is 1,000 or greater, a suitable oligomer component is obtained and therefore excellent heat-resistant storage stability is assured. When the weight average molecular weight (Mw) of the THF-soluble component of the binder resin is 30,000 or less, there is no steric hinderance that inhibits modification with the prepolymer, and therefore excellent offset resistance is assured.

In the present specification, the weight average molecular weight (Mw) is measured by means of gel permeation chromatography system (GPC-8220GPC, available from Tosoh Corporation) according to gel permeation chromatography (GPC). Three columns that are coupled together (TSKgel (registered trademark) SuperHZM-H, available from Tosoh Corporation, a length of each column: 15 cm) are stabilized in a heat chamber set to 40° C. THF serving as a solvent is fed to the columns having the temperature of 40° C. at a flow rate of 0.35 mL/min, followed by injecting 100 μL of a THF sample solution of the resin to measure a weight average molecular weight (Mw). The THF sample solution is prepared at a sample concentration of from 0.05% by mass through 0.6% by mass.

As a molecular weight of the sample, a molecular weight distribution of the sample is calculated from relation between a logarithm and count number of a calibration curve prepared by several monodisperse polystyrene standard samples. As the standard polystyrene samples for preparing a calibration curve, for example, standard polystyrene samples having molecular weights (Mp) of $6.87\times10^6$ (Mn/Mw: 1.09), $1.39\times10^5$ (Mn/Mw: 1.04), $2.77\times10^5$ (Mn/Mw: 1.04), $9.91\times10^5$ (Mn/Mw: 1.05), $2.0\times10^6$ (Mn/Mw: 1.03), $9.82\times10^3$ (Mn/Mw: 1.02), $6.02\times10^5$ (Mn/Mw: 1.02), $2.79\times10^3$ (Mn/Mw: 1.04), and $5.8\times10^2$ (Mn/Mw: 1.18), available from Pressure Chemical Co., TOSOH CORPORATION, or SHOWA DENKO K.K. are used. A number average molecular weight (Mn) and weight average molecular weight (Mw) of the sample are measured using a molecular weight calibration curve prepared from at least nine standard polystyrene samples. Moreover, a refractive index detector is used as a detector.

<Release Agent>

The release agent is not particularly limited, and may be appropriately selected in accordance with the intended purpose. The release agent is preferably a release agent having a low melting point that is 50° C. or higher and 120° C. or lower. The release agent having a low melting point, which is dispersed in the binder resin, effectively functions as a release agent at an interface between a fixing roller and the toner particles. Therefore, hot-offset resistance can be assured without applying a release agent, such as oil, onto the fixing roller.

The melting point of the release agent can be determined by measuring a maximum endothermic peak by means of a differential scanning calorimeter (TG-DSC SYSTEM TAS-100, available from Rigaku Corporation).

Examples of the release agent include wax. Specific examples of the wax include: vegetable wax, such as carnauba wax, cotton wax, Japanese wax, and rice wax; animal wax, such as bees wax, and lanolin wax; mineral wax, such as ozocerite, and ceresin; and petroleum wax such as paraffin wax, microcrystalline wax, and petrolatum wax. Other than the above-listed natural wax, synthetic hydrocarbon wax (e.g., Fischer-Tropsch wax, polyethylene wax, and polypropylene wax), and synthetic wax (e.g., ester, ketone, and ether) may be used. Moreover, fatty acid amide (e.g., 12-hydroxystearic acid amide, stearic acid amide, phthalimide anhydride, and chlorinated hydrocarbon), and a crystalline polymer having a long alkyl group at a side chain may be used. Examples of the crystalline polymer having a long alkyl group include a low-molecular weight crystalline polymer resin, such as a homopolymer or copolymer of polyacrylate (e.g., poly-n-stearylmethacrylate, and poly-n-laurylmethacrylate). Specific examples of the copolymer of polyacrylate include a n-stearyl acrylate-ethyl methacrylate copolymer. The above-listed examples may be used alone or in combination.

An amount of the release agent is not particularly limited, and may be appropriately selected in accordance with the intended purpose. The amount of the release agent is preferably 2% by mass or greater and 15% by mass or less, relative to a total amount of the toner. When the amount of the release agent is 2% by mass or greater, an excellent anti-offset effect may be assured. When the amount of the release agent is 15% by mass or less, excellent transfer properties and durability may be assured.

<Colorant>

The colorant is not particularly limited, and any of dyes and pigments known in the art may be used as the colorant. Examples of the colorant include carbon black, a nigrosine dye, iron black, naphthol yellow S, Hansa yellow (10G, 5G, G), cadmium yellow, yellow iron oxide, yellow ocher, yellow lead, titanium yellow, polyazo yellow, oil yellow, Hansa yellow (GR, A, RN, R), pigment yellow L, benzidine yellow (G, GR), permanent yellow (NCG), Vulcan fast yellow (5G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, parared, fiser red, parachloroorthonitro aniline red, lithol fast scarlet G, brilliant fast scarlet, brilliant carmine BS, permanent red (F2R, F4R, FRL, FRLL, and F4RH), fast scarlet VD, vulcan fast rubin B, brilliant scarlet G, lithol rubin GX, permanent red F5R, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, lithopone, and a mixture of any combination of the foregoing colorants.

An amount of the colorant is not particularly limited, and may be appropriately selected in accordance with the intended purpose. The amount of the colorant is preferably 1% by mass or greater and 15% by mass or less, and more preferably 3% by mass or greater and 10% by mass or less, relative to a total amount of the toner.

The colorant may be also used as a master batch in which the colorant forms a composite with a resin. The binder resin used for production of the master batch or kneaded together with the master batch is not particularly limited, and may be appropriately selected in accordance with the intended purpose. Examples of the binder resin include, in addition to the above-mentioned modified polyester resin and unmodified polyester resin, polymers of styrene or substituted styrene [e.g., polystyrene, poly(p-chlorostyrene), and polyvinyl toluene], styrene-based copolymers (e.g., a styrene-p-chlorostyrene copolymer, a styrene-propylene copolymer, a styrene-vinyl toluene copolymer, a styrene-vinyl naphthalene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-methyl α-chloromethacrylate copolymer, a styrene-acrylonitrile copolymer, a styrene-methyl vinyl ketone copolymer, a styrene-butadiene copolymer, a styrene-isoprene copolymer, a styrene-acrylonitrile-indene copolymer, a styrene-maleic acid copolymer, and a styrene-maleic acid ester copolymer), polymethyl methacrylate, polybutyl methacrylate, polyvinyl chloride, polyvinyl acetate, polyethylene, polypropylene, polyester, an epoxy resin, an epoxy-polyol resin, polyurethane, polyamide, polyvinyl butyral, a polyacrylic resin, rosin, modified rosin, a terpene resin, an aliphatic or alicyclic hydrocarbon resin, an aromatic petroleum resin, chlorinated paraffin, and paraffin wax. The above-listed examples may be used alone or in combination.

The master batch can be prepared by applying high shear force to a resin and colorant used for a master batch to mix and knead the mixture. In order to enhance the interaction between the colorant and the resin, an organic solvent may be used. Moreover, a flashing method is preferably used, since a wet cake of the colorant can be directly used without being dried. The flashing method is a method where an aqueous paste containing a colorant is mixed or kneaded with a resin and an organic solvent, and then the colorant is transferred into the resin, followed by removing the moisture and the organic solvent.

<Particles>

The particles are metal particles, or halogen particles, or both. The metal constituting the metal particles may have a monovalent or higher ionic valence. The particles function as a charge-controlling agent.

The toner includes the particles. Since the particles present at the surface portion of each of the toner particles satisfy the above-described abundance of the particles (X $\mu m^2$) and the declining rate of the particles in the surface portion of each of the toner particles, the particles are surely and evenly distributed at a surface of each of the toner particles with an appropriate thickness. Therefore, a toner having excellent properties (e.g., low-temperature fixability, hot-offset resistance, heat-resistant storage stability, and charging properties), reducing occurrence of toner scattering, and having excellent stability during use can be provided.

The particles are not particularly limited, provided that the particles are selected from the group consisting of metal particles and halogen particles where a metal constituting the metal particles may have a monovalent or higher ionic valence. The particles may be appropriately selected in accordance with the intended purpose. Examples of the particles include: metal particles, such as titanium particles, and zinc particles; and halogen particles, such as fluoride particles. The fluoride constituting the fluoride particles includes a fluorine element. The above-listed examples may be used alone or in combination. Among the above-listed examples, the fluoride particles are preferable, particles of a fluorosurfactant are more preferable, and particles of a cationic fluorosurfactant are particularly preferable because of excellent onset of charging, and notable reduction in occurrence of toner scattering.

The fluorosurfactant is not particularly limited, and may be appropriately selected in accordance with the intended purpose. Examples of the fluorosurfactant include disodium perfluorooctanesulfonylglutamate, sodium 3-[omega-fluoroalkyl(C6-C11)oxy]-1-alkyl(C3 or C4)sulfonate, sodium 3-[omega-fluoroalkanoyl(C6-C8)-N-ethylamino]-1-propanesulfonate, a C11-C20 fluoroalkyl carboxylic acid and a metal salt of the C11-C20 fluoroalkyl carboxylic acid, a C7-C13 perfluoroalkyl carboxylic acid and a metal salt of the C7-C13 perfluoroalkyl carboxylic acid, a C4-C12 perfluoroalkyl sulfonic acid and a metal salt of the C4-C12 perfluoroalkyl sulfonic acid, perfluorooctanesulfonic acid diethanolamide, N-propyl-N-(2-hydroxyethyl)perfluorooctane sulfonamide, a C6-C10 perfluoroalkyl sulfonamide propyltrimethyl ammonium salt, a C6-C10 perfluoroalkyl-N-ethylsulfonyl glycine salt, a C6-C16 perfluoroalkyl ethyl phosphate, an aliphatic primary amine including a fluoroalkyl group, an aliphatic secondary amine including a fluoroalkyl group, an aliphatic tertiary amine including a fluoroalkyl group, an aliphatic quaternary ammonium salt (e.g., a C6-C10 perfluoroalkyl sulfonamide propyltrimethyl ammonium salt), a benzalkonium salt, benzethonium chloride, a pyridinium salt, and an imidazolinium salt. The above-listed examples may be used alone or in combination.

The fluorosurfactant may be appropriately synthesized for use or may be selected from commercial products. Examples of product names of the commercial products of the fluorosurfactant include: SURFLON S-111, S-112, S-113, and S-121 (available from AGC SEIMI CHEMICAL CO., LTD.); FLUORAD FC-93, FC-95, FC-98, FC-129, and FC-135 (available from SUMITOMO 3M); UNIDYNE DS-101, DS-102, and DS-202 (available from DAIKIN INDUSTRIES, LTD.); MEGAFACE F-110, F-120, F-113, F-410, F-150, F-191, F-812, F-824, and F-833 (available from DIC CORPORATION); EFTOP EF-102, EF-103, EF-104, EF-105, EF-112, EF-123A, EF-123B, EF-132, EF-306A, EF-501, EF-201, and EF-204 (available from Mitsubishi Materials Electronic Chemicals Co., Ltd.); and FTERGENT F-100, F-150, and F-300 (available from NEOS COMPANY LIMITED).

A volume average particle diameter of the particles is not particularly limited, and may be appropriately selected in accordance with the intended purpose. The volume average particle diameter of the particles is preferably from 0.0001 μm through 0.0030 μm, and more preferably from 0.0001 μm through 0.0015 μm.

<Other Components>

The toner may include other components, as well as the binder resin, the release agent, the colorant, and the particles.

The above-mentioned other components are not particularly limited, provided that the components are selected from components typically used for a toner. The above-mentioned other components may be appropriately selected in accordance with the intended purpose. Examples of the above-mentioned other components include a surfactant, an external additive, a flowability improving agent, a cleaning improving agent, a magnetic material, resin particles, and a dispersing agent. The above-listed examples may be used alone or in combination. Among the above-listed examples, the toner preferably includes a surfactant and external additives.

An amount of the above-mentioned other components contained in the toner is not particularly limited, and may be appropriately selected in accordance with the intended purpose.

<<Surfactant>>

The surfactant is preferably added to the toner as a dispersing agent for emulsifying or dispersing an organic solvent phase including the polyester prepolymer etc.

The surfactant is not particularly limited, and may be appropriately selected in accordance with the intended purpose. The surfactant is preferably an anionic surfactant including a long-chain hydrocarbon group and a hydrophilic functional group.

Examples of such an anionic surfactant include anionic surfactants, such as an alkylbenzene sulfonic acid salt, an α-olefin sulfonic acid salt, and a phosphoric acid ester. The above-listed examples may be used alone or in combination.

The hydrocarbon group constitutes a hydrophobic site included in a molecular structure of the surfactant. Examples of the anionic surfactant including a long-chain hydrocarbon group and a hydrophilic functional group include a straight-chain alkyl benzene sulfonic acid salt where the number of carbon atoms in a main chain is 10 or greater relative to a hydroxyl group(s).

The number of the hydrocarbon groups is not particularly limited, and may be appropriately selected in accordance with the intended purpose. The number of hydrocarbon groups is preferable 1 or greater and 4 or less, and more preferably 1 or greater and 2 or less.

The number of the hydrocarbon groups can be analyzed by means of a liquid chromatography mass spectrometer (e.g., LCMS-8030, available from Shimadzu Corporation).

The hydrophilic functional group is a hydrophilic site included in the molecular structure of the surfactant. Examples of the hydrophilic functional group include a sulfo group.

The number of the hydrophilic functional groups is not particularly limited, and may be appropriately selected in accordance with the intended purpose. The number of the hydrophilic functional groups is preferably 1 or greater and 4 or less, and more preferably 3 or greater and 4 or less.

The number of the hydrophilic functional groups can be analyzed by means of a liquid chromatography mass spectrometer (e.g., LCMS-8030, available from Shimadzu Corporation).

The surfactant is preferably located at a surface portion of each of the toner particles.

An amount of the anionic surfactant including a long-chain hydrocarbon group and two or more hydrophilic functional groups in the surface portion of each of the toner particles is not particularly limited, and may be appropriately selected in accordance with the intended purpose. The amount of the anionic surfactant including a long-chain hydrocarbon group and two or more hydrophilic functional groups relative to a total amount of the anionic surfactants included in the surface portion of each of the toner particles is preferably from 80% by mass through 100% by mass, and more preferably from 90% by mass through 100% by mass. When the amount of the anionic surfactant including a long-chain hydrocarbon group and two or more hydrophilic functional groups in the surface portion of each of the toner particles is 80% by mass or greater, occurrence of toner scattering is minimized. When the amount of the anionic surfactant having a long-chain hydrocarbon group and two or more hydrophilic functional groups in the surface portion of each of the toner particles is 100% by mass or less, excellent properties, such as low-temperature fixability, hot-offset resistance, heat-resistant storage stability, and charging properties are assured, and occurrence of toner scattering is minimized.

<<External Additive>>

The external additive is preferably added for facilitating flowability of a resulting toner and improving developability and charging properties of the toner.

The external additive is not particularly limited, and may be appropriately selected in accordance with the intended purpose. The external additive is preferably inorganic particles.

Primary particle diameters of the inorganic particles are not particularly limited, and may be appropriately selected in accordance with the intended purpose. The primary particle diameters of the inorganic particles are preferably 5 nm or greater and 2 μm or less, and more preferably 5 nm or greater and 500 nm or less.

A BET specific surface area of the inorganic particles is not particularly limited, and may be appropriately selected in accordance with the intended purpose. The BET specific surface area of the inorganic particles is preferably 20 $m^2/g$ or greater and 500 $m^2/g$ or less.

A ratio of the inorganic particles used is not particularly limited, and may be appropriately selected in accordance with the intended purpose. An amount of the inorganic particles relative to a total amount of the toner is preferably 0.01% by mass or greater and 5% by mass or less, and particularly preferably 0.01% by mass or greater and 2.0% by mass or less.

Specific examples of the inorganic particles include silica, alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride The above-listed examples may be used alone or in combination. Among the above-listed examples, the inorganic particles are preferably a combination of hydrophobic silica particles and hydrophobic titanium oxide particles considering imparting flowability to a resulting toner. When the hydrophobic silica particles and the hydrophobic titanium oxide particles each having a volume average particle diameter of 50 μm or less are used in combination, particularly, electrostatic force and van der Waals force between the external additives and the toner base particles significantly improve as the external additives and the toner base particles are mixed and stirred. The increased electrostatic force and van der Waals force between the external additives and the toner base particles reduce detachment of the flowability imparting agent (i.e., the flowability improving agent) from the toner base particles even when the toner particles are stirred and mixed inside a developing device to achieve a desired charging level, and therefore excellent image quality is achieved and an amount of the residual toner after transferring is reduced.

Use of the titanium oxide particles added as the external additive is advantageous because excellent environmental stability and image density stability are assured. On the other hand, however, the titanium oxide particles have a disadvantage that onset of charging may not be satisfactory. When an amount of the titanium oxide particles is greater than an amount of the silica particles, the disadvantage of the titanium oxide particles may become noticeable. When the amount of the hydrophobic silica particles, and the amount of the hydrophobic titanium oxide particles are each in the range of 0.3% by mass or greater and 1.5% by mass or less, onset of charging is not significantly impaired, and desirable charging onset is assured. In other words, stable image quality is assured even when printing with the toner is continuously performed. Therefore, the above-mentioned range of the amount of the external additive is preferable.

<<Flowability Improving Agent>>

The flowability improving agent is not particularly limited, provided that the flowability improving agent is used to treat toner particles to enhance hydrophobicity of the toner particles and hence assures flowability or charging properties in high humidity conditions. The flowability improving agent may be appropriately selected in accordance with the intended purpose. Examples of the flowability improving agent include a silane coupling agent, a silylating agent, a fluoroalkyl group-containing silane coupling agent, an organic titanate-based coupling agent, an aluminium-based coupling agent, silicone oil, and modified silicone oil.

It is particularly preferable that the silica and the titanium oxide be surface treated with the above-described flowability improving agent and be used as hydrophobic silica and hydrophobic titanium oxide, respectively.

<<Cleaning Improving Agent>>

The cleaning improving agent is not particularly limited, provided that the cleaning improving agent is an agent added to the toner for removing the residual developer on a photoconductor or a primary transfer medium after transferring. The cleaning improving agent may be appropriately selected in accordance with the intended purpose. Examples of the cleaning improving agent include: fatty acid (e.g., stearic acid) metal salts, such as zinc stearate, and calcium stearate; and polymer particles produced by soap-free emulsion polymerization, such as polymethyl methacrylate particles, and polystyrene particles.

The polymer particles are preferably polymer particles having a relatively narrow particle size distribution, and are suitably polymer particles having the volume average particle diameter of from 0.01 μm through 1 μm.

<<Magnetic Material>>

The magnetic material is not particularly limited, and may be appropriately selected in accordance with the intended purpose. Examples of the magnetic material include iron powder, magnetite, and ferrite. Among the above-listed examples, white magnetic materials are preferable considering color tone of a resulting toner.

<<Resin Particles>>

The resin particles are not particularly limited, provided that the resin of the resin particles is a resin that can form aqueous dispersion elements in an aqueous dispersion liquid in an aqueous medium. The resin particles may be appropriately selected from particles of any of resins known in the art in accordance with the intended purpose. The resin may be a thermoplastic resin or a thermoset resin.

Specific examples of the resin particles include vinyl resin particles, polyurethane resin particles, epoxy resin particles, polyester resin particles, polyamide resin particles, polyimide resin particles, silicon-based resin particles, phenol resin particles, melamine resin particles, urea resin particles, aniline resin particles, ionomer resin particles, and polycarbonate resin particles. The above-listed examples may be used alone or in combination. Among the above-listed examples, the resin particles are preferably formed of at least one resin selected from the group consisting of a vinyl resin, a polyurethane resin, an epoxy resin, and a polyester resin because such resins can form an aqueous dispersion liquid of fine spherical resin particles.

The vinyl resin is a polymer obtained through homopolymerization or copolymerization of a vinyl monomer. Examples of the vinyl resin include a styrene-(meth)acrylate resin, a styrene-butadiene copolymer, a (meth)acrylic acid-acrylic acid ester polymer, and a styrene-acrylonitrile copolymer.

As the resin of the resin particles, moreover, a copolymer of a monomer including two or more unsaturated groups may be used. The monomer including two or more unsaturated groups is not particularly limited, and may be appropriately selected in accordance with the intended purpose. Examples of the monomer include a sodium salt of sulfonate of methacrylic acid ethylene oxide adduct (ELEMINOL RS-30, available from SANYO CHEMICAL CO., LTD.), divinyl benzene, and 1,6-hexanediol acrylate.

The resin particles may be formed through polymerization according to an appropriately selected method known in the art in accordance with the intended purpose. The resin particles are preferably prepared as an aqueous dispersion liquid of resin particles.

Examples of a preparation method of the aqueous dispersion liquid of the resin particles include the following (1) to (8):

(1) a method where a vinyl monomer is used as a starting raw material, and the vinyl monomer is polymerized through a polymerization reaction selected from suspension polymerization, emulsion polymerization, seed polymerization, and dispersion polymerization to directly prepare an aqueous dispersion liquid of resin particles of a vinyl resin;

(2) a method where a precursor (e.g., a monomer, and an oligomer) or a solvent solution of the precursor is dispersed in an aqueous medium in the presence of a suitable dispersing agent, followed by heating or adding a curing agent to cure to prepare an aqueous dispersion liquid of resin particles of a polyaddition or condensation resin (e.g., the polyester resin, a polyurethane resin, and an epoxy resin);

(3) a method where an appropriate emulsifier is dissolved in a precursor (e.g., a monomer, and an oligomer) or a solvent solution of the precursor (preferably in a state of a liquid, or may be liquidized by heating), followed by adding water to cause phase-transfer emulsification to prepare a dispersion liquid of resin particles of a polyaddition or condensation resin (e.g., the polyester resin, a polyurethane resin, and an epoxy resin);

(4) a method where a resin prepared in advance by any polymerization reaction, which may be any of polymerization reactions (e.g., addition polymerization, ring-opening polymerization, polyaddition polymerization, addition condensation polymerization, and condensation polymerization) is pulverized by means of a mechanical rotating or jet pulverizer, followed by classifying to yield resin particles, and the resin particles are dispersed in water in the presence of a suitable dispersing agent;

(5) a resin solution preparing by dissolving, in a solvent, a resin prepared in advance by a polymerization reaction, which may be any of polymerization reactions (e.g., addition polymerization, ring-opening polymerization, polyaddition polymerization, addition condensation polymerization, and condensation polymerization) is sprayed in the form of a mist to yield resin particles, and the resin particles are dispersed in water in the presence of a suitable dispersing agent;

(6) a method where a poor solvent is added to a resin solution prepared by dissolving, in a solvent, a resin prepared in advance by a polymerization reaction, which may be any of polymerization reactions (e.g., addition polymerization, ring-opening polymerization, polyaddition polymerization, addition condensation polymerization, and condensation polymerization), or a resin solution prepared by heating and dissolving the resin in a solvent in advance is cooled to precipitate resin particles, followed by removing the solvent to collect the resin particles, and the resin particles are dispersed in water in the presence of a suitable dispersing agent;

(7) a method where a resin solution preparing by dissolving, in a solvent, a resin prepared in advance by a polymerization reaction, which may be any of polymerization reactions (e.g., addition polymerization, ring-opening polymerization, polyaddition polymerization, addition condensation polymerization, and condensation polymerization) is dispersed in an aqueous medium in the presence of a suitable dispersing agent, followed by heating or reducing pressure to remove the solvent; and (8) a method where a suitable emulsifier is dissolved in a resin solution prepared by dissolving, in a solvent, a resin prepared in advance by a polymerization reaction, which may be any of polymerization reactions (e.g., addition polymerization, ring-opening polymerization, polyaddition polymerization, addition condensation polymerization, and condensation polymerization), followed by adding water to cause phase-transfer emulsification.

<<Dispersing Agent>>

The toner may include a dispersing agent other than the surfactants. Examples of the dispersing agent, other than the surfactants, include a poorly water-soluble inorganic compound dispersing agent. Examples of the poorly water-soluble inorganic compound dispersing agent include tricalcium phosphate, calcium carbonate, titanium oxide, colloidal silica, and hydroxyapatite. The dispersed droplets in the dispersion liquid may be stabilized with a polymer protective colloid. Examples of the polymer protective colloid include: acids, such as acrylic acid, methacrylic acid, α-cyanoacrylic acid, α-cyanomethacrylic acid, itaconic acid, crotonic acid, fumaric acid, maleic acid, and maleic acid anhydride; hydroxyl group-containing (meth)acryl-based monomers, such as p-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylate, diethylene glycol monomethacrylate, glycerin monoacrylate, glycerin monomethacrylae, N-methylolacrylamide, and N-methylolmethacrylamide; vinyl alcohol or vinyl alcohol ethers, such as vinyl methyl ether, vinyl ethyl ether, and vinyl propyl ether; esters of vinyl alcohol and a carboxyl group-containing compound, such as vinyl acetate, vinyl propionate, and vinyl butyrate; acryl amide (e.g., acryl amide, methacryl amide, diacetone acryl amide), and a methylol compound of the foregoing acryl amides; acid chlorides, such as acryloyl chloride, and methacryloyl chloride; a homopolymer or copolymer including a nitrogen atom or a nitrogen-containing heterocycle, such as vinyl pyridine, vinyl pyrrolidone, vinyl imidazole, and ethylene imine; polyoxyethylene-based colloids, such as polyoxy ethylene, polyoxy propylene, a polyoxy ethylene alkyl amine, a polyoxypropylene alkyl amine, a polyoxy ethylene alkyl amide, a polyoxy propylene alkyl amide, polyoxy ethylene nonylphenyl ether, polyoxy ethylene laurylphenyl ether, polyoxy ethylene stearylphenyl ester, and polyoxy ethylene nonylphenyl ester; and cellulose, such as methyl cellulose, hydroxyethyl cellulose, and hydroxypropyl cellulose. The above-listed examples may be used alone or in combination.

A production method of the toner is not particularly limited, and any of production methods known in the art can be used. The production method is preferably a method where a toner is produced in an aqueous medium through suspension polymerization, emulsion polymerization aggregation, or polymer dissolution suspension. The production method is particularly preferably a production method of the toner for developing an electrostatic latent image of the present disclosure, which will be described hereinafter.

(Production Method of Toner for Developing Electrostatic Latent Image)

The production method of a toner for developing an electrostatic latent image (may be merely referred to as a "production method of the toner" or a "toner production method") according to the present disclosure is a method of producing the toner for developing an electrostatic latent image.

The production method of the toner includes preparation of an oil phase, preparation of an aqueous phase, emulsification or dispersion, a cross-linking reaction and/or elongation reaction, and removal of a solvent. The production method may further include other steps, such as washing, and drying, according to the necessity.

The toner can be produced by the following method. The production method described hereinafter is an example of a wet production method. The production method of the toner according to the present disclosure is not limited to the following wet production method, and the toner may be produced by other wet production methods, or dry production methods, such as a pulverization method. The following production method is preferable because toner particles having a sharp particle size distribution can be formed, and storage stability of the resulting toner can be improved by introducing an elongating or cross-linking component.

<Preparation of Oil Phase>

The preparation of oil phase includes dissolving a binder resin precursor, the release agent, and the colorant in an organic solvent to prepare an oil phase.

Specifically, the toner raw materials, e.g., the colorant, the release agent, a precursor of a binder resin (e.g., the polyester prepolymer), and the compound that reacts with the polyester prepolymer through an elongation reaction or a cross-linking reaction (e.g., the amines, and tertiary amine compound), are added to an organic solvent to prepare an oil phase.

The organic solvent is not particularly limited, provided that the organic solvent is a solvent in which the toner raw materials are dissolved or dispersed. The organic solvent may be appropriately selected in accordance with the intended purpose. For example, the organic solvent is preferably a volatile organic solvent having a boiling point of lower than 150° C. as such an organic solvent can be removed easily. Examples of the organic solvent having a boiling point of lower than 150° C. include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. The above-listed examples may be used alone or in combination.

An amount of the organic solvent used is not particularly limited, and may be appropriately selected in accordance with the intended purpose. The amount of the organic solvent is preferably from 40 parts by mass through 300 parts by mass, more preferably from 60 parts by mass through 140 parts by mass, and even more preferably from 80 parts by mass through 120 parts by mass, relative to 100 parts by mass of the toner raw materials.

<Preparation of Aqueous Phase>

The preparation of an aqueous phase includes dispersing the resin particles, and preferably further dispersing or dissolving the surfactant, in an aqueous medium to prepare an aqueous phase.

The aqueous medium is not particularly limited, and may be appropriately selected from aqueous media known in the art. Examples of the aqueous medium include water, a solvent miscible with water, and a mixture including water and a solvent miscible with water.

The solvent miscible with water is not particularly limited, and may be appropriately selected from solvents known in the art. Examples of the solvent miscible with water include alcohol, dimethylformamide, tetrahydrofuran, cellosolves, and lower ketones.

Examples of the alcohol include methanol, isopropanol, and ethylene glycol.

Examples of the lower ketones include acetone, and methyl ethyl ketones.

The above-listed examples may be used alone or in combination.

An amount of the resin particles added to the aqueous medium is not particularly limited, and may be appropriately selected in accordance with the intended purpose. The amount of the resin particles is preferably from 0.5% by mass through 10% by mass.

An amount of the surfactant added to the aqueous medium is not particularly limited, and may be appropriately selected in accordance with the intended purpose. The amount of the surfactant is preferably from 5% by mass through 30% by mass, and more preferably from 10% by mass through 25% by mass.

<Emulsification or Dispersion>

The emulsification or dispersion includes dispersing or emulsifying the oil phase in the aqueous phase.

Examples of a method of stably forming dispersed elements each formed of the polyester prepolymer in the aqueous phase include a method where a solution or dispersion of the toner raw materials prepared by dissolving or dispersing the polyester prepolymer etc. in an organic solvent is added to the aqueous phase, and the resulting mixture is dispersed by applying shearing force.

The polyester prepolymer dissolved or dispersed in the organic solvent, and other toner raw materials, such as a colorant, and a release agent, may be mixed when dispersed elements are formed in an aqueous phase. It is however more preferable that the toner raw materials be mixed in advance, followed by dissolving or dispersing the mixed toner raw materials in an organic solvent, and the resulting mixture be added to and dispersed in an aqueous phase. Moreover, the toner raw materials, such as the colorant, and the release agent, are not necessarily mixed when particles are formed in an aqueous phase. The toner raw materials may be added after forming particles. For example, particles each of which does not include a colorant are formed, followed by adding the colorant to the formed particles according to any of dyeing methods know in the art.

A method of dispersing the organic solvent including the toner raw materials is not particularly limited, and may be appropriately selected in accordance with the intended purpose. Any of derives known in the art, such as a low-speed shearing disperser, a high-speed shearing disperser, a friction disperser, a high-pressure jet disperser, and an ultrasonic disperser, may be used. Among the above-listed examples, a high-speed shearing disperser is preferably used as a volume average particle diameter of the dispersed elements (i.e., oil droplets) can be adjusted to a range of 2 μm or greater and 20 μm or less.

When the high-speed shearing disperser is used, the rotational speed is not particularly limited. The rotational speed is preferably 1,000 rpm or greater and 30,000 rpm or less, and more preferably 5,000 rpm or greater and 20,000 rpm or less.

Duration of the dispersing is not particularly limited. In case of a batch system, the duration is typically 0.1 minutes or longer and 5 minutes or shorter.

A temperature during the dispersing is not particularly limited. The temperature is preferably 0° C. or higher and 150° C. or lower (under pressure), and more preferably 40° C. or higher and 98° C. or lower. The higher the temperature during the dispersion is, the lower the viscosity of the dispersed elements formed of the polyester prepolymer is and the easier the dispersing becomes. Therefore, the high temperature is preferable for the dispersing.

An amount of the aqueous medium used relative to 100 parts by mass of the solid content in the organic solvent phase of the polyester prepolymer is not particularly limited. The amount of the aqueous medium is preferably 50 parts by mass or greater and 2,000 parts by mass or less, and more preferably 100 parts by mass or greater and 1,000 parts by mass or less. When the amount of the aqueous medium relative to 100 parts by mass of the solid content in the organic solvent phase of the polyester prepolymer is 50 parts by mass or greater, the toner composition (i.e., the toner raw materials) is desirably dispersed to yield toner base particles having desired particle diameters. When the amount of the aqueous medium relative to 100 parts by mass of the solid content in the organic solvent phase of the polyester prepolymer is 2,000 parts by mass or less, it is economical considering an amount of processing water. Moreover, a dispersing agent may be optionally used. Use of the dispersing agent is preferable because toner base particles having a sharp particle distribution can be obtained, and the toner raw materials are stably dispersed.

<Cross-Linking Reaction and/or Elongation Reaction>

The cross-linking reaction and/or elongation reaction includes allowing the polymer to react through an elongation reaction and/or cross-linking reaction in the aqueous medium to form urea-modified polyester. As a result, toner base particles are formed in the aqueous medium.

Duration of the elongation reaction of the polyester prepolymer is not particularly limited, and may be appropriately selected according to reactivity due to a combination of an isocyanate group structure include in the polyester prepolymer and the amines. The duration is preferably 10 minutes or longer and 40 hours or shorter, and more preferably 2 hours or longer and 24 hours or shorter.

A temperature of the elongation reaction and/or cross-linking reaction of the polyester prepolymer is not particularly limited. The temperature is preferably 0° C. or higher and 150° C. or lower, and more preferably 40° C. or higher and 98° C. or lower.

When an elongation reaction and/or cross-linking reaction of the polyester prepolymer is carried out, any of catalysts known in the art may be optionally used. Specific examples of the catalyst include dibutyl tin laurate, and dioctyl tin laurate.

<Removal of Solvent>

The removal of the solvent includes removing the organic solvent from the reaction solution obtained by allowing the binder resin precursor to react through a cross-linking reaction and/or an elongation reaction in the emulsified dispersion liquid.

In order to remove the organic solvent from the obtained emulsified dispersion elements, the entire system is gradually heated to completely remove the organic solvent included in the droplets of the oil phase. At the time of the removal of the solvent, the internal system is turned into a stirred laminar flow, and the internal system is vigorously stirred at a certain temperature range, followed by removing the solvent to produce toner base particles each having a spindle shape. Shapes of the toner base particles can be adjusted from true spheres to shapes like rugby balls by vigorously stirring during removal of the organic solvent. Moreover, the texture of the surface of each toner base particle can be adjusted from a smooth surface to a wrinkled surface.

When a compound soluble to acid and alkali, such as calcium phosphate, is used as a dispersion stabilizer, the calcium phosphate is dissolved with acid, such as hydrochloric acid, followed by washing with water to remove the calcium phosphate from the toner base particles. Moreover, calcium phosphate may be also removed by decomposing the calcium phosphate with an enzyme.

Classification may be optionally performed on the obtained toner base particles to achieve a desired particle size distribution. The classification may be performed by removing the fine particle component by cyclone in a liquid, a decanter, or centrifugation. Alternatively, the classification may be performed after drying and collecting toner base particles as powder. However, performing the classification in a liquid is preferable considering efficiency.

<Washing>

The washing includes washing a cross-linking and/or elongation reaction product (i.e., toner base particles) obtained in the removal of the solvent.

A method of the washing is not particularly limited, and may be appropriately selected in accordance with the intended purpose.

The particles (i.e., a charge-controlling agent), which are one of raw materials of the toner, are preferably added in the final stage of the washing so that the abundance (X $\mu m^2$) of the particles in a surface portion of each of the toner base particles, and the declining rate of the particles in a surface portion of each of the toner base particles are satisfied.

<Drying>

The drying includes drying the washed toner base particles to yield a toner for developing an electrostatic latent image.

A method of the drying is not particularly limited. The drying may be performed using any of dryers known in the art.

(Developer)

The developer of the present disclosure includes at least the toner for developing an electrostatic latent image of the present disclosure. The developer may further include appropriately selected other components, such as a magnetic carrier, in accordance with the intended purpose.

The developer may be a one-component developer, or a two-component developer. In the case where the developer is used for high-speed printers that can correspond to improved information processing speed of recent years, the developer is preferably a two-component developer because service life of the developer improves.

<Magnetic Carrier>

The magnetic carrier is not particularly limited, and may be appropriately selected in accordance with the intended purpose. The magnetic carrier preferably includes magnetic carrier particles, each including a core particle and a resin layer covering the core particle.

—Core Particles—

The core particles are not particularly limited, and may be appropriately selected in accordance with the intended purpose. As the core particles, any of core particles known in the art, such as iron powder, ferrite powder, and magnetite powder, may be used.

A volume average particle diameter of the core particles is not particularly limited, and may be appropriately selected in accordance with the intended purpose. The volume average particle diameter of the core particles is preferably 20 μm or greater and 200 μm or less.

—Resin Layer—

A material used for the resin layer is not particularly limited, and may be appropriately selected in accordance with the intended purpose. Examples of the material of the resin layer include an amino-based resin (e.g., a urea-formaldehyde resin, a melamine resin, a benzoguanamine resin, a urea resin, a polyamide resin, and an epoxy resin), a polyvinyl-based resin o polyvinylidene-based resin (e.g., an acrylic resin, a polymethyl methacrylate resin, a polyacrylonitrile resin, a polyvinyl acetate resin, a polyvinyl alcohol resin, a polyvinyl butyral resin, and a polystyrene resin), a polystyrene-based resin (e.g., a styrene-acryl copolymer resin), a halogenated olefin resin (e.g., polyvinyl chloride), a polyester-based resin (e.g., a polyethylene terephthalate resin, and a polybutylene terephthalate resin), a polycarbonate-based resin, a polyethylene resin, a polyvinyl fluoride resin, a polyvinylidene fluoride resin, a polytrifluoroethylene resin, a polyhexafluoropropylene resin, a vinylidene fluoride-acryl monomer copolymer, a copolymer of vinylidene fluoride or vinyl fluoride, a fluoroterpolymer of tetrafluoroethylene, vinylidene fluoride, and a monomer that does not include a fluoro group, and a silicone resin.

The resin layer may optionally include conductive powder.

The conductive powder is not particularly limited, and may be appropriately selected in accordance with the intended purpose. Examples of the conductive powder include metal powder, carbo black, titanium oxide, tin oxide, and zinc oxide. The above-listed examples may be used alone or in combination.

A volume average particle diameter of the conductive powder is not particularly limited, and may be appropriately selected in accordance with the intended purpose. The volume average particle diameter of the conductive powder is preferably 1 μm or less. The conductive powder having the volume average particle diameter of 1 μm or less is preferable considering adjustment of electric resistance.

As the developer, a mixture of the toner and the magnetic carrier may be used. A blending ratio of the magnetic carrier and the toner in the developer is not particularly limited, and may be appropriately selected in accordance with the intended purpose. For example, the amount of the toner is preferably 1 part by mass or greater and 10 parts by mass or less, relative to 100 parts by mass of the carrier.

EXAMPLES

The present disclosure will be described below by way of Examples. The present disclosure should not be construed as being limited to these Examples.

In the following synthesis examples, an acid value, a hydroxyl value, and a weight average molecular weight (Mw) of each resin (e.g., a crystalline polyester resin, an amorphous polyester resin, and a polyester prepolymer) were measured in the following manner.

<<Measurement of Acid Value>>

An acid value was measured according to a measuring method disclosed in JIS K0070-1992 under the following conditions.

First, 0.5 g of a sample (0.3 g of an ethyl acetate-soluble component) was added to 120 mL of toluene, where the sample was each of the above-mentioned resins. The resulting mixture was stirred for about 10 hours at room temperature (23° C.) to dissolve the sample. To the resulting solution, 30 mL of ethanol was added to prepare a sample solution.

An acid value of the sample solution was measured at 23° C. by means of an automatic potentiometric titrator (DL-53 Titrator, available from METTLER TOLEDO) and an electrode DG113-SC (available from METTLER TOLEDO). The result was analyzed using analysis software LabX Light Version 1.00.000. A mixed solvent including 120 mL of toluene and 30 mL of ethanol was used for the titrator.

The measurement was performed in the above-described manner, but the acid value was specifically calculated in the following manner. The sample was titrated using 0.1 N potassium hydroxide/alcohol solution, which had been prepared in advance as a standard, and an acid value was determined from the titrated amount according to the following formula.

$$\text{Acid value [mgKOH/g]} = \text{titrated amount [mL]} \times N \times 56.1\ \text{[mg/mL]} / \text{mass of sample [g]}$$

In the formula above, "N" is a factor of a 0.1 N potassium hydroxide/alcohol solution.

<<Measurement of Hydroxyl Value>>

A hydroxyl value was measured according to a measuring method disclosed in JIS K0070-1966 under the following conditions.

First, 0.5 g of a sample (each of the above-mentioned resins) was precisely weighed in a 100 mL measuring flask, and 5 mL of an acetylation reagent was accurately added. Thereafter, the measuring flask was immersed in a bath set to 100° C.±5° C. to heat the mixture. One to two hours later, the measuring flask was removed from the bath, followed by leaving the measuring flask to cool. Thereafter, water was added to the mixture, and the resulting mixture was agitated to decompose acetic anhydride. In order to decompose the acetic anhydride completely, the flask was again heated in the bath for 10 minutes or longer, followed by leaving the measuring flask to cool. Then, the wall of the flask was adequately washed with an organic solvent, to thereby prepare a sample solution.

Potentiometric titration of the sample solution was performed at 23° C. by means of an automatic potentiometric titrator (DL-53 Titrator, available from METTLER TOLEDO) and an electrode DG113-SC (available from METTLER TOLEDO) using a N/2 potassium hydroxide/ethyl alcohol solution, to thereby measure a hydroxyl value. The result was analyzed using analysis software LabX Light Version 1.00.000. A mixed solvent including 120 mL of toluene and 30 mL of ethanol was used for the titrator.

<<Measurement of Weight Average Molecular Weight (Mw)>>

A weight average molecular weight (Mw) was measured in the following manner.

- Gel permeation chromatography (GPC) spectrometer: GPC-8220GPC (available from Tosoh Corporation)
- Columns: TSKgel (registered trademark) Super-HZM-H (particle diameter: 3 μm, inner diameter: 6 μm, length: 15 cm, 3-coupled column system) (available from Tosoh Corporation)
- Temperature: 40° C.
- Solvent: tetrahydrofuran (THF)
- Feeding rate: 0.35 mL/min
- Pretreatment of sample: A sample was dissolved in tetrahydrofuran (THF, including a stabilizer, available from FUJIFILM Wako Pure Chemical Corporation) to form a solution having a concentration of 0.15% by mass, and the resulting solution was filtered through a filter having a pore size of 0.2 μm. The resulting filtrate was used as a sample.

To the GPC spectrometer, 100 μL of the tetrahydrofuran sample solution (concentration: 0.15% by mass), which had been pretreated, was fed.

For measurement of a weight average molecular weight (Mw) of the crystalline polyester resin, a molecular weight distribution of the sample was calculated from the relation between a logarithm and count number of a calibration curve prepared by several monodisperse polystyrene standard samples.

As the standard polystyrene samples for preparing the calibration curve, Showdex (registered trademark) STANDARD Std. No S-6870, S-136, S-277, S-991, S-2000, S-9.8, S-602, S-2.8, and S-0.6 available from SHOWA DENKO K.K., and toluene were used.

As the detector, a refractive index (RI) detector was used.

Synthesis Example A-1: Synthesis of Crystalline Polyester Resin (1)

A 5 L four-necked flask equipped with a nitrogen-inlet tube, dehydration tube, a stirrer, and a thermocouple was charged with 2,500 parts by mass of 1,12-decanediol, 2,330 parts by mass of 1,8-octanedioic acid, and 4.9 parts by mass of hydroquinone. After allowing the resulting mixture to react for 20 hours at 180° C., the reaction system was heated to 200° C. to react for 6 hours, followed by reacting for 10 hours at 8.3 kPa, to thereby synthesize Crystalline Polyester Resin (1).

Crystalline Polyester Resin (1) obtained had a melting point of 64° C., a weight average molecular weight (Mw) of 5,720, and an acid value of 28 mgKOH/g.

Synthesis Example B-1: Synthesis of Wax Dispersing Agent (1)

An autoclave reactor chamber equipped with a thermometer and a stirrer was charged with 600 parts by mass of xylene and 300 parts by mass of low-molecular weight polyethylene (SANWAX LEL-400, available from SANYO CHEMICAL CO., LTD., softening point: 128° C.). The resulting mixture was sufficiently dissolved with nitrogen purging, followed by adding a mixed solution including 2,310 parts by mass of styrene, 270 parts by mass of acrylonitrile, 150 parts by mass of butyl acrylate, 78 parts by mass of di-t-butylperoxyhexahydroterephthalate, and 455 parts by mass of xylene by dripping over the course of 3 hours at 175° C. to polymerize the mixture. The temperature was kept at 175° C. for 30 minutes, to thereby synthesize Wax Dispersing Agent (1).

Synthesis Example C-1: Synthesis of Amorphous Polyester Resin (1) (Low-Molecular Weight Polyester Resin)

A reaction vessel equipped with a cooling tube, a stirrer, and a nitrogen-inlet tube was charged with 90 parts by mass of a bisphenol A ethylene oxide (2 mol) adduct, 209 parts by mass of a bisphenol A propylene oxide (3 mol) adduct, 208 parts by mass of terephthalic acid, 46 parts by mass of adipic acid, and 2 parts by mass of dibutyl tin oxide, and the resulting mixture was allowed to react for 12 hours at 230° C. under normal pressure. Subsequently, the reaction solution was allowed to react for 5 hours under the reduced pressure of from 10 mmHg through 15 mmHg. To the reaction vessel, 25 parts by mass of trimellitic anhydride was added, and the resulting mixture was allowed to react for 2 hours at 180° C. under normal pressure, to thereby synthesize Amorphous Polyester (1).

Amorphous Polyester (1) obtained had a hydroxyl value of 15 mgKOH/g, a weight average molecular weight (Mw) of 10,000, and an acid value of 5 mgKOH/g.

Synthesis Example D-1: Synthesis of Polyester Prepolymer (1)

A reaction vessel equipped with a cooling tube, a stirrer, and a nitrogen-inlet tube was charged with 682 parts by mass of a bisphenol A ethylene oxide (2 mol) adduct, 81 parts by mass of a bisphenol A propylene oxide (2 mol) adduct, 283 parts by mass of terephthalic acid, 22 parts by mass of trimellitic anhydride, and 2 parts by mass of dibutyl tin oxide. The resulting mixture was allowed to react for 8 hours at 230° C. under normal pressure. The reaction solution was then allowed to react for 5 hours under the reduced pressure of from 10 mmHg through 15 mmHg to thereby synthesize Intermediate Polyester.

Next, a reaction vessel equipped with a cooling tube, a stirrer, and a nitrogen-inlet tube was charged with 410 parts by mass of Intermediate Polyester synthesized, 89 parts by mass of isophorone diisocyanate, and 500 parts by mass of ethyl acetate, and the resulting mixture was allowed to react for 5 hours at 100° C., to thereby synthesize Polyester Prepolymer (1).

An amount of free isocyanate groups of Polyester Prepolymer (1) was 1.53% by mass.

Synthesis Example E-1: Synthesis of Surfactant (1)

A reaction chamber equipped with a cooling tube, a stirrer, and a gas-inlet tube was charged with 1,000 parts by mass of undecane (available from Tokyo Chemical Industry Co., Ltd.), followed by reacting through liquid-phase chlorination at a temperature of from 100° C. through 120° C. with introducing chlorine gas from the gas-introducing tube. To the chlorinated product from which the hydrogen chloride was removed, 1,684 parts by mass of diphenyl ether (available from FUJIFILM Wako Pure Chemical Corporation) was added, and then 101 parts by mass of an alkylation catalyst having an aluminium chloride content of 27, by mass was added. The resulting mixture was allowed to react through an alkylation reaction for about 60 minutes at 100° C. The alkylation reaction product was left to stand to separate the catalyst, and unreacted components were removed by distillation, to thereby yield Alkylation Reaction Product (1). Alkylation Reaction Product (1) was treated with fuming sulfuric acid to sulfonate for 60 minutes, followed by neutralizing with sodium hydroxide, to thereby yield alkyl benzene sulfonic acid salt as Surfactant (1).

Surfactant (1) was analyzed by LCMS under the following analysis conditions to determine the number of long-chain hydrocarbon groups, and the number of hydrophilic functional groups. As a result, the number of the long-chain hydrocarbon groups in Surfactant (1) was 3, and the number of the hydrophilic functional groups in Surfactant (1) was 2.

[LCMS Analysis Conditions]

Measuring device: LCMS-8030 (available from Shimadzu Corporation)

Column: InertSustain (registered trademark) Swift C18 (particle diameter: 2 μm, inner diameter: 2.1 μm, length: 100 μm, available from GL Sciences Inc.)

Mobile Phase:

Solution A: 0.5% by volume ammonium acetate aqueous solution/methanol=80%/20% (v/v)

Solution B: methanol

Gradient program: A/B=0%/100% (v/v)→A/B=100%/0% (v/v) (for 10 minutes with retaining for 5 minutes)→A/B=0%/100 (v/v) (for 15 minutes with retaining for 5 minutes)

Flow rate: 0.3 mL/min

Injected amount: 0.2 μL

Synthesis Example E-2: Synthesis of Surfactant (2)

Surfactant (2) was obtained in the same manner as in Synthesis Example E-1, except that the duration of sulfonation was changed from 60 minutes to 100 minutes. The number of the long-chain hydrocarbon groups and the number of the hydrophilic functional groups were measured in the same manner as the measurement on Surfactant (1). As a result, the number of the long-chain hydrocarbon groups in Surfactant (2) was 1, and the number of the hydrophilic functional groups in Surfactant (2) was 4.

Synthesis Example E-3: Synthesis of Surfactant (3)

Surfactant (3) was obtained in the same manner as in Synthesis Example E-1, except that the duration of sulfonation was changed from 60 minutes to 80 minutes. The number of the long-chain hydrocarbon groups and the number of the hydrophilic functional groups were measured in the same manner as the measurement on Surfactant (1). As a result, the number of the long-chain hydrocarbon groups in Surfactant (3) was 2, and the number of the hydrophilic functional groups in Surfactant (3) was 3.

Synthesis Example E-4: Synthesis of Surfactant (4)

Surfactant (4) was obtained in the same manner as in Synthesis Example E-1, except that the duration of sulfonation was changed from 60 minutes to 30 minutes. The number of the long-chain hydrocarbon groups and the number of the hydrophilic functional groups were measured in the same manner as the measurement on Surfactant (1). As a result, the number of the long-chain hydrocarbon groups in Surfactant (4) was 4, and the number of the hydrophilic functional groups in Surfactant (4) was 1.

Example 1

<Production of Toner>

—Preparation of Pigment/Wax Dispersion Liquid—

A vessel equipped with a stirring rod and a thermometer was charged with 723 parts by mass of Amorphous Polyester (1), 110 parts by mass of carnauba wax (WA-05, available from CERARICA NODA Co., Ltd.), 77 parts by mass of Wax Dispersing Agent (1) (the amount of the wax dispersing agent was 70% by mass relative to the amount of the wax), and 947 parts by mass of ethyl acetate. The resulting mixture was heated to 80° C. with stirring, and the temperature was maintained at 80° C. for 5 hours, followed by cooling to 30° C. over the course of 1 hour.

To the vessel, 155 parts by mass of carbon black (Printex 35, available from Degussa) and 500 parts by mass of ethyl acetate were added. The resulting mixture was mixed for 1 hour to thereby obtain a raw material solution.

The obtained raw material solution (1,324 parts by mass) was transferred into a vessel, and the raw material solution was dispersed to disperse the carbon black and the wax by means of a bead mill (ULTRA VISCOMILL, available from AIMEX CO., LTD.) at the feeding rate of 1 kg/hr and the disk circumferential speed of 6 m/sec where the bead mill was filled with 0.5 mm zirconia beads by 80% by volume, and the raw material solution was passed through the bead mill 3 times.

Subsequently, 1,042.3 parts by mass of a 65% by mass ethyl acetate solution of Amorphous Polyester (1) synthesized was added, and the resulting mixture was passed through the bead mill once under the above-described conditions, to thereby obtain Pigment and Wax Dispersion Liquid.

Pigment and Wax Dispersion Liquid obtained had a solid content of 50% by mass.

—Preparation of Amorphous Polyester Resin (1) Solution—

A 2 L metal vessel was charged with 100 parts by mass of Amorphous Polyester (1) synthesized and 400 parts by mass of ethyl acetate. The resulting mixture was heated and dissolved at 40° C., followed by cooling in ice bath, to thereby prepare Amorphous Polyester Resin (1) Solution.

—Preparation of Oil Phase—

A vessel was charged with 664 parts by mass of Pigment and Wax Dispersion Liquid (the amount of the wax relative to a toner as a final product was to be 4% by mass), 73 parts by mass of Polyester Prepolymer (1), 19 parts by mass of Crystalline Polyester Resin (1), 150 parts by mass of Amorphous Polyester Resin (1), and 7.8 parts by mass of 5-amino-1,3,3-trimethylcyclohexanemethylamine (available from Sigma-Aldrich Japan). The resulting mixture was mixed by means of TK Homomixer (available from PRIMIX Corporation) for 1 minute at 5,000 rpm, to thereby obtain Oil Phase.

—Synthesis of Particle Dispersion Liquid (1) (Organic Particle Emulsion)—

A reaction vessel equipped with a stirring rod and a thermometer was charged with 683 parts by mass of water, 11 parts by mass of a sodium salt of sulfate of methacrylic acid-ethylene oxide adduct (ELEMINOL RS-30, available from SANYO CHEMICAL CO., LTD.), 138 parts by mass of styrene, 138 parts by mass of methacrylic acid, and 1 part by mass of ammonium persulfate. The resulting mixture was stirred for 15 minutes at 400 rpm, to thereby obtain a white emulsion.

The obtained emulsion was heated to elevate the internal system temperature to 75° C., and was reacted for 5 hours.

Moreover, 30 parts by mass of a 1% by mass ammonium persulfate aqueous solution was added, and the resulting mixture was matured for 5 hours at 75° C. to thereby obtain Particle Dispersion Liquid (1) that was an aqueous dispersion liquid of a vinyl-based resin (i.e., a styrene-methacrylic acid-sodium salt of sulfate of methacrylic acid-ethylene oxide adduct copolymer). A proportion of the resin particles to Particle Dispersion Liquid (1) was 20% by mass, and the resin particles in Particle Dispersion Liquid (1) had a volume average particle diameter of 0.1 μm.

—Preparation of Aqueous Phase—

Water (884.0 parts by mass), 16.0 parts by mass of Particle Dispersion Liquid (1), 210.0 parts by mass of Surfactant (1), and 90.0 parts by mass of ethyl acetate were mixed to thereby obtain a milky white liquid, which was provided as Aqueous Phase.

—Emulsification and Removal of Solvent—

Next, a vessel was charged with 800 parts by mass of Oil Phase, and 1,200 parts by mass of Aqueous Phase. The resulting mixture was mixed by means of TK Homomixer for 20 minutes at 18,000 rpm, to thereby obtain emulsified slurry.

To 2,050 parts by mass of the obtained emulsified slurry, 410 parts by mass of ion-exchanged water was added. The resulting mixture was transferred into a vessel equipped with a stirrer and a thermoset, and the solvent was removed from the mixture for 8 hours at 30° C., followed by maturing for 4 hours at 45° C., to thereby obtain Dispersion Slurry. The particles in Dispersion Slurry had a volume average particle diameter of 5.2 μm.

—Washing and Drying—

After filtering 100 parts by mass of Dispersion Slurry by vacuum filtration, the following processes (1) to (4) were performed.

(1) To the resulting filtration cake, 100 parts by mass of ion-exchanged water was added, and the resulting mixture was mixed by means of a TK Homomixer (available from PRIMIX Corporation) for 10 minutes at 12,000 rpm, followed by performing filtration.

(2) To the filtration cake obtained in (1), 100 parts by mass of a 10% by mass sodium hydroxide aqueous solution was added, and the resulting mixture was mixed by means of the TK Homomixer for 30 minutes at 12,000 rpm, followed by performing vacuum filtration.

(3) To the filtration cake obtained in (2), 100 parts by mass of 10; by mass hydrochloric acid was added, and the resulting mixture was mixed by means of the TK Homomixer for 10 minutes at 12,000 rpm, followed by performing filtration.

(4) To the filtration cake obtained in (3), 100 parts by mass of ion-exchanged water was added, and the resulting mixture was mixed by means of the TK Homomixer for 10 minutes at 12,000 rpm, to thereby obtain a toner dispersion liquid.

A fluorosurfactant (MEGAFACE F-410, Available From DIC Corporation) was dissolved in ion-exchanged water, to thereby prepare a 1% by mass fluorosurfactant solution.

To the toner dispersion liquid, subsequently, 0.9 parts by mass of the fluorosurfactant solution was added relative to the toner solid content of the toner dispersion liquid. The resulting mixture was mixed by means of a TK Homomixer at 5,000 rpm, followed by performing filtration, to thereby obtain a filtration cake.

The obtained filtration cake was dried by means of an air circulation dryer for 48 hours at 45° C. The resulting dried product was sieved through a sieve having a mesh-size of 75 μm, to thereby produce Toner Base Particles 1.

—External Additive Treatment—

To 100 parts by mass of Toner Base Particles 1 obtained, 0.7 parts by mass of hydrophobic silica (HDK (registered trademark) H2000, available from Wacker Asahikkasei Silicone Co., Ltd.) and 0.3 parts by mass of hydrophobic titanium oxide (JMT-150IB, available from TAYCA CORPORATION) were added as externa additives. The resulting mixture was mixed by means of HENSCHEL MIXER (available from NIPPON COKE & ENGINEERING CO., LTD.) to perform an external additive treatment, to thereby produce Toner 1 of Example 1.

Example 2

<Production of Toner>

Toner 2 of Example 2 was produced in the same manner as the toner of Example 1, except that, Surfactant (1) was replaced with Surfactant (2) in "Preparation of Aqueous Phase," the rotational speed of TK Homomixer was changed from 18,000 rpm to 8,000 rpm in "Emulsification and removal of solvent," and the amount of the fluorosurfactant relative to the solid content of the toner was changed from 0.9% by mass to 0.3% by mass in "Washing and drying."

Example 3

<Production of Toner>

Toner 3 of Example 3 was produced in the same manner as the toner of Example 1, except that, Surfactant (1) was replaced with Surfactant (3) in "Preparation of Aqueous Phase," and the amount of the fluorosurfactant relative to the solid content of the toner was changed from 0.9% by mass to 0.4% by mass in "Washing and drying."

Example 4

<Production of Toner>

Toner 4 of Example 4 was produced in the same manner as the toner of Example 1, except that, Surfactant (1) was replaced with Surfactant (3) in "Preparation of Aqueous Phase," the rotational speed of TK Homomixer was changed from 18,000 rpm to 13,000 rpm in "Emulsification and removal of solvent," and the amount of the fluorosurfactant relative to the solid content of the toner was changed from 0.9% by mass to 0.6% by mass in "Washing and drying."

Example 5

<Production of Toner>

Toner 5 of Example 5 was produced in the same manner as the toner of Example 1, except that, Surfactant (1) was replaced with Surfactant (2) in "Preparation of Aqueous Phase," the rotational speed of TK Homomixer was changed from 18,000 rpm to 13,000 rpm in "Emulsification and removal of solvent," and the amount of the fluorosurfactant relative to the solid content of the toner was changed from 0.9% by mass to 0.6% by mass in "Washing and drying."

Example 6

<Production of Toner>

Toner 6 of Example 6 was produced in the same manner as the toner of Example 1, except that "Preparation of Oil Phase," "Preparation of Aqueous Phase," "Emulsification and removal of solvent," and "Washing and drying" were changed as follows.

—Preparation of Oil Phase—

A vessel was charged with 664 parts by mass of Pigment and Wax Dispersion Liquid (the amount of the wax in the toner was 4% by mass), 28 parts by mass of Crystalline Polyester Resin (1) Solution, and 223 parts by mass of Amorphous Polyester Resin (1) Solution. The resulting mixture was mixed by TK Homomixer (available from PRIMIX Corporation) for 1 minute at 5,000 rpm to thereby obtain Oil Phase.

—Preparation of Aqueous Phase—

Aqueous Phase of Example 6 was obtained in the same manner as in "Preparation of Aqueous Phase" of Example 1, except that Surfactant (1) was replaced with Surfactant (2).

—Emulsification and Removal of Solvent—

Dispersion Slurry of Example 6 was obtained in the same manner as in "Emulsification and removal of solvent" of Example 1, except that the rotational speed of TK Homomixer was changed from 18,000 rpm to 13,000 rpm. Dispersion Slurry obtained had the volume average particle diameter of about 5 μm.

—Washing and Drying—

Toner Base Particles 6 of Example 6 were produced in the same manner as in "Washing and drying" of Example 1, except that the amount of the fluorosurfactant relative to the solid content of the toner was changed from 0.9% by mass to 0.6% by mass.

Example 7

<Production of Toner>

Toner 7 of Example 7 was produced in the same manner as the toner of Example 1, except that, Surfactant (1) was replaced with Surfactant (2) in "Preparation of Aqueous Phase," the rotational speed of TK Homomixer was changed from 18,000 rpm to 13,000 rpm in "Emulsification and removal of solvent," and the amount of the fluorosurfactant relative to the solid content of the toner was changed from 0.9% by mass to 0.7% by mass in "Washing and drying."

Comparative Example 1

<Production of Toner>

Toner 8 of Comparative Example 1 was produced in the same manner as the toner of Example 1, except that, Surfactant (1) was replaced with Surfactant (4) in "Preparation of Aqueous Phase," the rotational speed of TK Homomixer was changed from 18,000 rpm to 13,000 rpm in "Emulsification and removal of solvent," and the amount of the fluorosurfactant relative to the solid content of the toner was changed from 0.9% by mass to 0.4% by mass in "Washing and drying."

Comparative Example 2

<Production of Toner>

Toner 9 of Comparative Example 2 was produced in the same manner as the toner of Example 1, except that, Surfactant (1) was replaced with Surfactant (4) in "Preparation of Aqueous Phase," the rotational speed of TK Homomixer was changed from 18,000 rpm to 13,000 rpm in "Emulsification and removal of solvent," and the amount of the fluorosurfactant relative to the solid content of the toner was changed from 0.9% by mass to 1.1% by mass in "Washing and drying."

Comparative Example 3

<Production of Toner>

Toner 10 of Comparative Example 3 was produced in the same manner as the toner of Example 1, except that, the rotational speed of TK Homomixer was changed from 18,000 rpm to 13,000 rpm in "Emulsification and removal of solvent," and the amount of the fluorosurfactant relative to the solid content of the toner was changed from 0.9% by mass to 0.1% by mass in "Washing and drying."

The details of Toners 1 to 10 obtained in Examples 1 to 7 and Comparative Examples 1 to 3, respectively, are summarized in Tables 1-1 and 1-2.

(Measurement of Physical Properties of Toner)

Each of Toners 1 to 10 obtained in Examples 1 to 7 and Comparative Examples 1 to 3, respectively, was subjected to measurement of an abundance of halogen particles in a surface portion of each of toner particles, calculation of a declining rate, measurement of a relative amount of wax at a surface portion of each of toner particles, and measurement of a residual rate of a surfactant at a surface portion of each of toner particles. The results are presented in Table 2.

<Measurement of Abundance of Halogen Particles in Surface Portion of Each of Toner Particles and Calculation of Declining Rate>

—Measurement of Abundance of Halogen Particles in Surface Portion of Each of Toner Particles—

An abundance of the halogen particles in a surface portion of each of the toner particles of each toner was measured in the following manner.

EDX mapping of a fluorine (F) element at a surface portion of each of the toner particles was performed by means of a scanning electron microscope (SEM) and an energy dispersive X-ray spectrometer (EDX) with setting the field of view to 100 $\mu m^2$ under the following analysis conditions to determine an area of the halogen particles present in the surface portion of each of the toner particles.

The toner particles were evenly distributed and fixed on a piece of carbon tape, and surfaces of the toner particles were observed under the following analysis conditions by means of an ultra-high-resolution scanning electron microscope (FE-SEM ULTRA 55, available from ZEISS) and an energy dispersive X-ray spectrometer (NORAN System Six, available from Thermo Fisher Scientific K.K.) to capture a secondary electron image of the toner. Comparing between the SEM image and the EDX image of the fluorine (F) element, an abundance of the halogen particles was determined. The analysis was performed at five points, five times per point, with each acceleration voltage, and an average value of the measured values was determined as an abundance of the halogen particles per 100 μm² of the surface of each of the toner particles.

[SEM Analysis Conditions]

Acceleration voltage: 1 kV, 3 kV, or 5 kV
Emission: 30 mV
Working distance (WD): 11 mm
Magnification: 40,000×
Field of view: 100 μm²
Resolution: 256×192 pixels
Frame time: the fastest (180 s)
Frame number: 10,000

[EDX Analysis Conditions]

Probe current: high
Capacitor lens: 5
Detector filter: smoothing

—Calculation of Declining Rate of Halogen Particles—

The declining rate of the halogen particles was calculated according to Formula (1) below, where X μm² was the abundance that was an area of the halogen particles present in a surface portion of each of the toner particles as measured by the SEM-EDX with setting a magnification to 40,000×, field of view to 100 μm², and acceleration voltage to 1 kV, and Y μm² was an abundance that was an area of the halogen particles present in a surface portion of each of the toner particles as measured by the SEM-EDX with setting a magnification to 40,000×, field of view to 100 μm², and acceleration voltage to 3 kV.

$$\text{Declining rate of particles }(\%)=(X-Y)/X\times 100 \qquad \text{Formula (1)}$$

<Measurement of Relative Amount of Wax at Surface Portion of Toner Particle>

A relative amount of the wax at a surface portion of each of the toner particles of each toner was measured in the following manner.

As a measuring sample, 3 g of each toner was pressed by means of an automatic pelletizer (Type M No. 50 BRP-E, available from MAEKAWA TESTING MACHINE CO.) for 1 minute with load of 6 t to prepare a toner pellet having a diameter of 40 mm and a thickness of approximately 2 mm.

The prepared toner pellet was measured by means of a Fourier transform infrared spectrometer (FT-IR) (Spectrum One, available from PERKIN ELMER, in which MultiScope FT-IR unit was installed) with micro attenuated total reflectance (ATR) of a germanium (Ge) crystal having a diameter of 100 μm, where an incidence angle of an infrared ray was set to 41.5°, resolution was set to 4 $cm^{-1}$, and integration was 20 times.

The obtained absorption peak (height of base line: from 2,830 $cm^{-1}$ through 2,870 $cm^{-1}$) at a wavelength of 2,850 $cm^{-1}$ derived from the release agent was determined as $P_{2850}$ and the absorption spectrum peak (height of base line: from 743 $cm^{-1}$ through 890 $cm^{-1}$) at a wavelength of 828 $cm^{-1}$ derived from the binder resin was determined as $P_{828}$. The measurement was performed with changing a measuring point. The absorption spectrum was measured four times at each measuring point, and an average value of the measured values was determined to calculate an intensity ratio ($P_{2850}/P_{828}$). The measuring points were the following four points in total. The first measuring point was (x: −10 mm and y: +10 mm), the second measuring point was (x: +10 mm and y: +10 mm), the third measuring point was (x: −10 mm and y: −10 mm), and the fourth measuring point was (x: +10 mm and y: −10 mm), where x was a transverse direction, and y was a longitudinal direction, when the center of the prepared toner pellet was determined as 0 (zero). The intensity ratio ($P_{2850}/P_{828}$) was provided as a relative amount of the wax at a surface portion of each of the toner particles of each toner.

<Measurement of Residual Rate of Surfactant at Surface Portion of Each of Toner Particles>

The residual rate of the surfactant at a surface portion of each of the toner particles of each toner was measured in the following manner.

To 0.1 g of each toner, 10 mL of methanol was added, and the resulting mixture was irradiated with ultrasonic waves for 30 minutes. The dispersion liquid obtained after the ultrasonic wave irradiation was filtered through a filter having a pore size of 2 μm, to thereby obtain a surfactant extraction liquid. The obtained surfactant extraction liquid was provided as a measuring sample.

Using Surfactant (1), Surfactant (2), Surfactant (3), or Surfactant (4) as the standard sample, LCMS analysis was performed on the measuring sample according to an absolute calibration curve method under the following analysis conditions. A composition ratio of each surfactant component was determined from the maximum peak detected from the measuring sample.

[LCMS Analysis Conditions]

Measuring device: LCMS-8030 (available from Shimadzu Corporation)
Column: InertSustain (registered trademark) Swift C18 (particle diameter: 2 μm, inner diameter: 2.1 μm, length: 100 μm, available from GL Sciences Inc.)
  Solution A: 0.5% by volume ammonium acetate aqueous solution/methanol=80%/20% (v/v)
  Solution B: methanol
Gradient program: A/B=0%/100% (v/v)→A/B=100%/0% (v/v) (for 10 minutes with retaining for 5 minutes)→A/B=0%/100% (v/v) (for 15 minutes with retaining for 5 minutes)
Flow rate: 0.3 mL/min
Injected amount: 0.2 μL (Evaluations of Toner)

Next, Toners 1 to 10 obtained in Examples 1 to 7 and Comparative Examples 1 to 3, respectively, were evaluated for toner scattering, low-temperature fixability, hot-offset resistance, and heat-resistant storage stability in the following manner. The evaluation results are presented in Table 3 below.

<Toner Scattering>

By means of a commercially available digital full-color printer (imagio MPC6000, available from Ricoh Company Limited, A4 landscape-orientation 50 sheets/min), a chart having an imaging area rate of 20% was continuously printed on 80,000 sheets, and the degree of toner contamination inside the printer was visually observed by a specialist. The toner scattering was evaluated with a 4-level scale according to the following evaluation criteria. The results of "fair" or better were determined as being no problem on practical use.

[Evaluation Criteria]

Excellent: No toner contamination was observed, and the printer was in excellent conditions.
Good: An inappreciable level of contamination was observed, but it was not a problematic level.
Fair: A very low level of contamination was observed.
Poor: An intolerable level of contamination was observed, and it was problematic.

<Low-Temperature Fixability>

By means of a commercially available photocopier (imageo Neo C600), a 3 cm×5 cm rectangular image was printed on an A4-size sheet (T6000 70W long-grain paper, available from Ricoh Company Limited) at the position which was 5 cm from the front end of the sheet with a toner deposition amount of 0.85 mg/cm$^2$.

Subsequently, a temperature of a fixing member was constantly controlled at 120° C., and the image was fixed at the linear speed of 300 mm/sec. The mass of the toner was calculated from the mass of the sheet before and after the image output. Occurrence of offset at 120° C. was visually observed by a specialist. The low-temperature fixability was evaluated with a 4-level scale according to the following evaluation criteria. The results of "fair" or better were determined as being no problem on practical use.

[Evaluation Criteria]

Excellent: Cold offset did not occur.

Good: Occurrence of cold offset was observed in very small portions, and the number of the portions was 3 or less.

Fair: Occurrence of cold offset was observed in vary small portions, and the number of the portions was more than 3.

Poor: Cold offset occurred, and it was problematic on practical use.

<Hot-Offset Resistance>

The evaluation was performed in the same manner as in the evaluation method for low-temperature fixability, except that the fixing temperature was changed from 120° C. to 180° C. Occurrence of hot offset at 180° C. was visually observed by a specialist. The hot-offset resistance was evaluated with a 4-level scale according to the following evaluation criteria. The results of "fair" or better were determined as being no problem on practical use.

[Evaluation Criteria]

Excellent: Hot offset did not occur.

Good: Occurrence of hot offset was observed in very small portions, and the number of the portions was 3 or less.

Fair: Occurrence of hot offset was observed in vary small portions, and the number of the portions was more than 3.

Poor: Hot offset occurred, and it was problematic on practical use.

<Heat-Resistant Storage Stability>

After storing 5 g of the toner (the amount of the initial toner) for 8 hours at 50° C., the toner was sieved through a sieve having a mesh-size of 355 μm for 2 minutes, and a mass of the residual toner on the mesh (the amount of the toner after the heat treatment) was measured. A residual rate of the toner was calculated according to the following formula, and heat-resistant storage stability was evaluated from the residual rate with a 4-level scale according to the following evaluation criteria. The results of "fair" or better were determined as being no problem on practical use.

$$\text{Residual rate (\%)}=(\text{amount of initial toner (g)}-\text{amount of toner after heat treatment (g)})/\text{amount of initial toner (g)}\times 100$$

[Evaluation Criteria]

Excellent: The residual rate was less than 5%, which was not problematic at all.

Good: The residual rate was 5% or greater and less than 10%, indicating slightly inferior storage stability, but it was not a problematic level on practical use.

Fair: The residual rate was 10% or greater and less than 30%, indicating slightly inferior storage stability, but it was a tolerable level on practical use.

Poor: The residual rate was 30% or greater, and it was a problematic level on practical use.

TABLE 1-1

| | | Surfactant | | | |
|---|---|---|---|---|---|
| | Toner | Type | Sulfonation duration [min] | Long-chain hydrocarbon group [number] | Hydrophilic functional group [number] |
| Ex. 1 | Toner 1 | Surfactant (1) | 60 | 3 | 2 |
| Ex. 2 | Toner 2 | Surfactant (2) | 100 | 1 | 4 |
| Ex. 3 | Toner 3 | Surfactant (3) | 80 | 2 | 3 |
| Ex. 4 | Toner 4 | Surfactant (3) | 80 | 2 | 3 |
| Ex. 5 | Toner 5 | Surfactant (2) | 100 | 1 | 4 |
| Ex. 6 | Toner 6 | Surfactant (2) | 100 | 1 | 4 |
| Ex. 7 | Toner 7 | Surfactant (2) | 100 | 1 | 4 |
| Comp. Ex. 1 | Toner 8 | Surfactant (4) | 30 | 4 | 1 |
| Comp. Ex. 2 | Toner 9 | Surfactant (4) | 30 | 4 | 1 |
| Comp. Ex. 3 | Toner 10 | Surfactant (1) | 60 | 3 | 2 |

TABLE 1-2

| | Emulsification conditions | | Amount of cationic fluorosurfactant relative to solid |
|---|---|---|---|
| | Rotational speed [rpm] | Time [min] | content of toner [% by mass] |
| Ex. 1 | 18,000 | 20 | 0.9 |
| Ex. 2 | 8,000 | 20 | 0.3 |
| Ex. 3 | 18,000 | 20 | 0.4 |
| Ex. 4 | 13,000 | 20 | 0.6 |
| Ex. 5 | 13,000 | 20 | 0.6 |
| Ex. 6 | 13,000 | 20 | 0.6 |
| Ex. 7 | 13,000 | 20 | 0.7 |
| Comp. Ex. 1 | 13,000 | 20 | 0.4 |
| Comp. Ex. 2 | 13,000 | 20 | 1.1 |
| Comp. Ex. 3 | 13,000 | 20 | 0.1 |

TABLE 2

| | | Particle abundance by SEM-EDX at each acceleration voltage [μm$^2$] | | | Declining rate of particles | FTIR-ATR intensity ratio | Type of metal or halogen | Surfactant residual rate |
|---|---|---|---|---|---|---|---|---|
| | Toner | 1 kV | 3 kV | 5 kV | [%] | ($P_{2850}/P_{828}$) | particles | [%] (*1) |
| Ex. 1 | Toner 1 | 9.500 | 1.805 | 0.000 | 81.0 | 0.20 | fluorine | 82.0 |
| Ex. 2 | Toner 2 | 3.500 | 0.003 | 0.000 | 99.9 | 0.09 | fluorine | 99.0 |
| Ex. 3 | Toner 3 | 4.000 | 0.400 | 0.000 | 90.0 | 0.21 | fluorine | 91.0 |

TABLE 2-continued

| | Toner | Particle abundance by SEM-EDX at each acceleration voltage [$\mu m^2$] 1 kV | 3 kV | 5 kV | Declining rate of particles [%] | FTIR-ATR intensity ratio ($P_{2850}/P_{828}$) | Type of metal or halogen particles | Surfactant residual rate [%] (*1) |
|---|---|---|---|---|---|---|---|---|
| Ex. 4 | Toner 4 | 5.000 | 0.400 | 0.000 | 92.0 | 0.15 | fluorine | 90.0 |
| Ex. 5 | Toner 5 | 4.000 | 0.004 | 0.000 | 99.9 | 0.14 | fluorine | 100.0 |
| Ex. 6 | Toner 6 | 5.000 | 0.100 | 0.000 | 98.0 | 0.16 | fluorine | 99.0 |
| Ex. 7 | Toner 7 | 7.000 | 0.035 | 0.000 | 99.5 | 0.15 | fluorine | 99.0 |
| Comp. Ex. 1 | Toner 8 | 3.800 | 1.178 | 0.000 | 69.0 | 0.15 | fluorine | 70.0 |
| Comp. Ex. 2 | Toner 9 | 11.000 | 3.080 | 0.000 | 72.0 | 0.16 | fluorine | 70.0 |
| Comp. Ex. 3 | Toner 10 | 2.700 | 0.513 | 0.000 | 81.0 | 0.15 | fluorine | 80.0 |

(*1): a residual rate of an anionic surfactant including a long-chain hydrocarbon group and a functional group relative to a total amount of the anionic surfactants remained in a surface portion of each toner base particle.

TABLE 3

| | Toner | Evaluation results: Toner scattering | Low-temperature fixability | Hot-offset resistance | Heat-resistant storage stability |
|---|---|---|---|---|---|
| Ex. 1 | Toner 1 | Good | Fair | Fair | Excellent |
| Ex. 2 | Toner 2 | Fair | Good | Good | Excellent |
| Ex. 3 | Toner 3 | Excellent | Good | Fair | Excellent |
| Ex. 4 | Toner 4 | Excellent | Good | Excellent | Excellent |
| Ex. 5 | Toner 5 | Excellent | Excellent | Excellent | Excellent |
| Ex. 6 | Toner 6 | Excellent | Excellent | Excellent | Fair |
| Ex. 7 | Toner 7 | Excellent | Excellent | Excellent | Excellent |
| Comp. Ex. 1 | Toner 8 | Fair | Poor | Fair | Good |
| Comp. Ex. 2 | Toner 9 | Good | Poor | Poor | Good |
| Comp. Ex. 3 | Toner 10 | Poor | Fair | Fair | Good |

As it was clear from the evaluation results in Table 3, the toners of Examples 1 to 7 had excellent results of toner scattering, low-temperature fixability, hot-offset resistance, and heat-resistant storage stability. Conversely, the toners of Comparative Examples 1 to 3 had the results indicating a problem on practical use in at least one of toner scattering, low-temperature fixability, hot-offset resistance, and heat-resistant storage stability.

For example, embodiments of the present disclosure are as follows.

<1> A toner for developing an electrostatic latent image, the toner including:

toner particles, each toner particle including:

a binder resin;

a release agent;

a colorant; and particles, wherein the particles are metal particles, or halogen particles, or a combination of the metal particles and the halogen particles, where a metal constituting the metal particles may have a monovalent or higher ionic valence, wherein an abundance X of the particles is within the range represented by 3 $\mu m^2 \leq X\ \mu m^2 \leq 10\ \mu m^2$, where X $\mu m^2$ is the abundance X that is an area of the particles present in a surface portion of each of the toner particles measured by a scanning electron microscope-energy dispersive X-ray spectrometer (SEM-EDX) with setting a magnification to 40,000×, field of view to 100 $\mu m^2$, and acceleration voltage to 1 kV, and wherein a declining rate of the particles represented by Formula (1) is from 80% through 100%, $$\text{Declining rate of particles } (\%) = (X-Y)/X \times 100 \qquad \text{Formula (1)}$$

where Y $\mu m^2$ is an abundance Y of the particles that is an area of the particles present in a surface portion of each of the toner particles as measured by the SEM-EDX with setting a magnification to 40,000×, field of view to 100 $\mu m^2$, and acceleration voltage to 3 kV.

<2> The toner according to <1>, wherein the abundance X of the particles is within the range represented by 4 $\mu m^2 \leq X\ \mu m^2 \leq 7\ \mu m^2$.

<3> The toner according to <1> or <2>, wherein an intensity ratio ($P_{2850}/P_{828}$) is 0.10 or greater and 0.19 or less, where the intensity ratio ($P_{2850}/P_{828}$) is a ratio of an absorption spectrum peak at a wavelength of 2,850 $cm^{-1}$ to an absorption spectrum peak at a wavelength of 828 $cm^{-1}$, the absorption spectrum peaks being determined by measuring the surface of each of the toner particles by Fourier transform infrared spectroscopy-attenuated total reflectance (FTIR-ATR).

<4> The toner according to any one of <1> to <3>, wherein the particles are fluoride particles.

<5> The toner according to any one of <1> to <4>, wherein each of the toner particles includes one or more anionic surfactants at a surface portion of each of the toner particles, where the anionic surfactants each include a long-chain hydrocarbon group and a hydrophilic functional group, and wherein an amount of an anionic surfactant including a long-chain hydrocarbon group and two or more hydrophilic functional groups is from 80% through 100% relative to a total amount of the anionic surfactants included in the surface portion of each of the toner particles.

<6> A method of producing a toner for developing an electrostatic latent image, the method comprising:

dissolving a compound that reacts with a binder resin precursor through an elongation reaction or a cross-linking reaction in an oil phase, where the oil phase is prepared by dissolving the binder resin precursor, a release agent, and a colorant in an organic solvent;

dispersing the oil phase in an aqueous medium in which resin particles are dispersed to form an emulsified dispersion liquid;

allowing the binder resin precursor to react through an elongation reaction or a cross-linking reaction in the emulsified dispersion liquid to yield a reaction product;

removing the organic solvent; and adding particles to the reaction product to produce the toner according to any one of <1> to <5>.

<7> The method according to <6>, wherein the aqueous medium further includes a surfactant, and wherein the surfactant is an anionic surfactant including a long-chain hydrocarbon group and a hydrophilic functional group.

The toner according to any one of <1> to <5> and the method according to <6> or <7> can solve the above-described various problems existing in the art and can achieve the object of the present disclosure.

What is claimed is:

1. A method of producing a toner for developing an electrostatic latent image, the method comprising:

dissolving a compound that reacts with a binder resin precursor through an elongation reaction or a cross-linking reaction in an oil phase, where the oil phase is prepared by dissolving the binder resin precursor, a release agent, and a colorant in an organic solvent;

dispersing the oil phase in an aqueous medium in which resin particles are dispersed to form an emulsified dispersion liquid;

allowing the binder resin precursor to react through an elongation reaction or a cross-linking reaction in the emulsified dispersion liquid to yield a reaction product;

removing the organic solvent; and adding particles of a fluorosurfactant to the reaction product to produce a toner, wherein the toner includes:

toner particles, each toner particle including:

a binder resin derived from the binder resin precursor;

the release agent;

the colorant; and the particles of the fluorosurfactant, wherein the particles of the fluorosurfactant are metal particles, or halogen particles, or a combination of the metal particles and the halogen particles, where a metal constituting the metal particles may have a monovalent or higher ionic valence, wherein an abundance X of the particles of the fluorosurfactant is within a range represented by 3 $\mu m^2 \leq X\ \mu m^2 \leq 10\ \mu m^2$, where X $\mu m^2$ is the abundance X that is an area of the particles of the fluorosurfactant present in a surface portion of each of the toner particles measured by a scanning electron microscope-energy dispersive X-ray spectrometer (SEM-EDX) with setting a magnification to 40,000×, field of view to 100 $\mu m^2$, and acceleration voltage to 1 kV, and wherein a declining rate of the particles of the fluorosurfactant represented by Formula (1) is from 80% through 100%, $$\text{Declining rate of particles of the fluorosurfactant (\%)}=(X-Y)/X\times 100 \qquad \text{Formula (1)}$$

where Y $\mu m^2$ is an abundance Y of the particles of the fluorosurfactant that is an area of the particles of the fluorosurfactant present in a surface portion of each of the toner particles as measured by the SEM-EDX with setting a magnification to 40,000×, field of view to 100 $\mu m^2$, and acceleration voltage to 3 kV; and wherein the binder resin contains a crystalline polyester resin.

2. The method according to claim 1, wherein the aqueous medium further includes a surfactant, and wherein the surfactant is an anionic surfactant including a long-chain hydrocarbon group and a hydrophilic functional group.

3. The method according to claim 1, wherein the abundance X of the particles of the fluorosurfactant is within the range represented by 4 $\mu m^2 \leq X\ \mu m^2 \leq 7\ \mu m^2$.

4. The method according to claim 1, wherein an intensity ratio ($P_{2850}/P_{828}$) is 0.10 or greater and 0.19 or less, where the intensity ratio ($P_{2850}/P_{828}$) is a ratio of an absorption spectrum peak at a wavelength of 2,850 $cm^{-1}$ to an absorption spectrum peak at a wavelength of 828 $cm^{-1}$, the absorption spectrum peaks being determined by measuring the surface of each of the toner particles by Fourier transform infrared spectroscopy-attenuated total reflectance (FTIR-ATR).

5. The method according to claim 1, wherein each of the toner particles includes one or more anionic surfactants at a surface portion of each of the toner particles, where the one or more anionic surfactants each include a long-chain hydrocarbon group and a hydrophilic functional group, and wherein an amount of an anionic surfactant including a long-chain hydrocarbon group and two or more hydrophilic functional groups is from 80% through 100% relative to a total amount of the one or more anionic surfactants included in the surface portion of each of the toner particles.

6. The method according to claim 2, wherein a number of hydrophilic functional groups is 3 or 4.

7. The method according to claim 6, wherein a number of long-chain hydrocarbon groups is 2 or 3.

* * * * *